(12) United States Patent
Yang et al.

(10) Patent No.: US 12,238,823 B2
(45) Date of Patent: Feb. 25, 2025

(54) MEASUREMENT METHOD AND APPARATUS

(71) Applicant: HUAWEI TECHNOLOGIES CO., LTD., Shenzhen (CN)

(72) Inventors: Shuigen Yang, Shenzhen (CN); Chuan Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 17/891,257

(22) Filed: Aug. 19, 2022

(65) Prior Publication Data
US 2022/0400370 A1    Dec. 15, 2022

Related U.S. Application Data

(63) Continuation of application No. PCT/CN2020/076253, filed on Feb. 21, 2020.

(51) Int. Cl.
H04W 8/22    (2009.01)
H04W 28/02    (2009.01)
H04W 76/27    (2018.01)

(52) U.S. Cl.
CPC ......... *H04W 8/22* (2013.01); *H04W 28/0215* (2013.01); *H04W 28/0268* (2013.01); *H04W 76/27* (2018.02)

(58) Field of Classification Search
CPC ............... H04W 8/22; H04W 28/0215; H04W 28/0268; H04W 76/27; H04W 24/10;
(Continued)

(56) References Cited

U.S. PATENT DOCUMENTS

| | | | |
|---|---|---|---|
| 2013/0286868 A1 | 10/2013 | Oyman et al. | |
| 2019/0319868 A1* | 10/2019 | Svennebring | H04W 24/08 |
| 2021/0259040 A1* | 8/2021 | Babaei | H04W 72/23 |

FOREIGN PATENT DOCUMENTS

| | | |
|---|---|---|
| CN | 103385017 A | 11/2013 |
| CN | 109792623 A | 5/2019 |

(Continued)

OTHER PUBLICATIONS

Huawei, HiSilicon, Discussion QoE Measurement Collection for streaming services. 3GPP TSG-RAN WG2 #96, Reno, Nevada, USA, Nov. 14-18, 2016, R2-168022, 22 pages.
(Continued)

*Primary Examiner* — Kyaw Z Soe
(74) *Attorney, Agent, or Firm* — HAUPTMAN HAM, LLP

(57) ABSTRACT

A first access network device sends, to a terminal device, an application layer measurement configuration used to indicate the terminal device to perform quality of experience measurement and collection on a first service. The application layer measurement configuration includes a type of the first service and an indicator of quality of experience of the first service. The type of the first service includes one or more of Augmented Reality (AR), Virtual Reality (VR), and 5th Generation Media Streaming (5GMS). The first access network device receives an application layer measurement report from the terminal device. The application layer measurement report includes the type of the first service and a value corresponding to the indicator of quality of experience of the first service.

20 Claims, 7 Drawing Sheets

(58) Field of Classification Search
CPC . H04W 24/08; H04L 41/5067; H04L 41/0853
See application file for complete search history.

(56) References Cited

FOREIGN PATENT DOCUMENTS

| CN | 104519521 B | 6/2019 |
|---|---|---|
| IN | 201308605 A | 12/2014 |
| WO | 2012136633 A1 | 10/2012 |
| WO | 2019129163 A1 | 7/2019 |

OTHER PUBLICATIONS

Extended European Search Report issued in corresponding European Application No. 20920239.9, dated Feb. 22, 2023, pp. 1-11.
India Office Action issued in corresponding India Application No. 202247049055, dated Nov. 23, 2022, pp. 1-5.
China Unicom, New SID: Study on NR QoE management and optimizations for diverse services. 3GPP TSG RAN meeting #86, Sitges, Spain, Dec. 9-12, 2019, RP-193256, 4 pages.
3GPP TS 25.331 V15.4.0 (Sep. 2018), 3rd Generation Partnership Project; Technical Specification Group Radio Access Network; Radio Resource Control (RRC); Protocol specification(Release 15), 2316 pages.
ITU-T H.265(Nov. 2019), Series H: Audiovisual and Multimedia Systems. Infrastructure of audiovisual services—Coding of moving video. High efficiency video coding, 712 pages.
3GPP TS 26.118 V15.2.0 (Sep. 2019), 3rd Generation Partnership Project; Technical Specification Group Services and System Aspects; Virtual Reality (VR) profiles for streaming applications (Release 15), 69 pages.
ITU-T H.264(Jun. 2019), Series H: Audiovisual and Multimedia Systems. Infrastructure of audiovisual services—Coding of moving video. Advanced video coding for generic audiovisual services. 836 pages.
3GPP TS 26.247 V16.2.0 (Dec. 2019), 3rd Generation Partnership Project; Technical Specification Group Services and System Aspects; Transparent end-to-end Packet-switched Streaming Service (PSS);Progressive Download and Dynamic Adaptive Streaming over HTTP (3GP-DASH)(Release 16), 139 pages.
3GPP TS 26.234 V15.1.0 (Sep. 2018), 3rd Generation Partnership Project; Technical Specification Group Services and System Aspects; Transparent end-to-end Packet-switched Streaming Service (PSS); Protocols and codecs(Release 15), 174 pages.
3GPP TS 28.405 V1.1.0 (Nov. 2019), 3rd Generation Partnership Project; Technical Specification Group Services and System Aspects; Telecommunication management; Quality of Experience (QoE) measurement collection; Control and configuration (Release 16), 19 pages.
3GPP TS 26.261 V0.0.1 (Apr. 2019), 3rd Generation Partnership Project; Technical Specification Group Services and System Aspects; Terminal audio quality performance requirements for immersive audio services Release 17, 10 pages.
3GPP TS 32.422 V16.0.0 (Dec. 2019), 3rd Generation Partnership Project; Technical Specification Group Services and System Aspects; Telecommunication management;Subscriber and equipment trace; Trace control and configuration management(Release 16), 197 pages.
3GPP TS 26.501 V16.2.0 (Dec. 2019), 3rd Generation Partnership Project; Technical Specification Group Services and System Aspects; 5G Media Streaming (5GMS); General description and architecture (Release 16), 55 pages.
3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.
3GPP TR 26.928 V1.3.0 (Feb. 2020), 3rd Generation Partnership Project; Technical Specification Group Services and System Aspects; Extended Reality (XR) in 5G (Release 16), 131 pages.
3GPP TS 38.300 V16.0.0 (Dec. 2019), 3rd Generation Partnership Project; Technical Specification Group Radio Access Network; NR; NR and NG-RAN Overall Description; Stage 2(Release 16), 101 pages.
3GPP TS 38.306 V15.8.0 (Dec. 2019), 3rd Generation Partnership Project; Technical Specification Group Radio Access Network; NR; User Equipment (UE) radio access capabilities(Release 15), 60 pages.
3GPP TS 38.323 V15.6.0 (Jun. 2019), 3rd Generation Partnership Project; Technical Specification Group Radio Access Network; NR; Packet Data Convergence Protocol (PDCP) specification (Release 15), 26 pages.
3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.
3GPP TS 38.413 V16.0.0 (Dec. 2019), 3rd Generation Partnership Project; Technical Specification Group Radio Access Network; NG-RAN; NG Application Protocol (NGAP)(Release 16), 335 pages.
3GPP TS 38.423 V16.0.0 (Dec. 2019), 3rd Generation Partnership Project; Technical Specification Group Radio Access Network; NG-RAN; Xn application protocol (XnAP)(Release 16), 330 pages.
3GPP TS 38.473 V16.0.0 (Dec. 2019), 3rd Generation Partnership Project; Technical Specification Group Radio Access Network; NG-RAN; F1 application protocol (F1AP) (Release 16), 239 pages.
3GPP TS 26.114 V16.4.0 (Dec. 2019), 3rd Generation Partnership Project; Technical Specification Group Services and System Aspects; IP Multimedia Subsystem (IMS); Multimedia Telephony; Media handling and interaction(Release 16), 440 pages.

* cited by examiner

MEASUREMENT METHOD AND APPARATUS

CROSS-REFERENCE TO RELATED APPLICATIONS

This application is a continuation of International Application No. PCT/CN2020/076253, filed on Feb. 21, 2020, the disclosure of which is hereby incorporated by reference in its entirety.

BACKGROUND

With development of communication technologies, an emerging service such as augmented reality (augmented reality, AR), virtual reality (virtual reality, VR), or 5th generation media streaming (5th generation media streaming, 5GMS) emerges, and occupies a large market share. For example, when the AR is applied to fields such as navigation, information query, and entertainment, a user obtains more real interaction experience by using a terminal device having an AR application. For example, when the terminal device is AR glasses, and the user participates in an entertainment activity such as a game by using the AR glasses, the user may experience a panoramic and real game image by using VR glasses.

Currently, the user expects to have better experience when using the foregoing emerging service. To provide better experience for the user, a wireless network for transmitting the emerging service needs to meet a transmission requirement of the emerging service. Therefore, how to meet the transmission requirement of the foregoing emerging service becomes an urgent problem to be resolved currently.

SUMMARY

In at least one embodiment, a measurement method and apparatus, to provide transmission of an emerging service, and improve user experience in response to a user using the emerging service.

To achieve the foregoing objectives, the following technical solutions are used in at least one embodiment.

According to a first aspect, a measurement method is provided, and includes: A first access network device sends, to a terminal device, an application layer measurement configuration used to indicate the terminal device to perform quality of experience measurement and collection on a first service. The application layer measurement configuration includes a type of the first service and an indicator of quality of experience of the first service. The type of the first service includes one or more of AR, VR, and 5GMS. The first access network device receives, from the terminal device, an application layer measurement report that includes the type of the first service and a value corresponding to the indicator of quality of experience of the first service.

According to the measurement method provided in the first aspect, for an emerging service such as the VR, the AR, or the 5GMS of the terminal device, the access network device sends, to the terminal device, the application layer measurement configuration used to indicate the terminal device to perform quality of experience measurement and collection on the emerging service, so that the terminal device performs quality of experience measurement and collection on the emerging service based on the application layer measurement configuration, to obtain the application layer measurement report of the emerging service, and sends the application layer measurement report to the access network device. After receiving the application layer measurement report, a network side performs, based on the value corresponding to the indicator of quality of experience in the application layer measurement report, network optimization on a wireless network used to transmit the service, so that an optimized wireless network provides a transmission of the service, to improve user experience in response to a user using the first service.

In at least one embodiment, with reference to the first aspect, the first access network device sends the application layer measurement configuration to the terminal device in response to the first access network device determining that the terminal device supports performing quality of experience measurement and collection on the first service.

Based on at least one embodiment, in response to determining that the terminal device supports performing quality of experience measurement and collection on the first service, the first access network device indicates the terminal device to perform quality of experience measurement and collection on the first service. This avoids a problem caused because the network side still indicates the terminal device to perform quality of experience measurement and collection in response to the terminal device not supporting performing quality of experience measurement and collection on the first service/does not have a capability of performing quality of experience measurement and collection on the first service, and improves accuracy of performing quality of experience measurement and collection on the first service by the terminal device.

In at least one embodiment, with reference to any one of the first aspect or at least one embodiment involving the first aspect, the first access network device receives capability information from the terminal device. The capability information is used to indicate that the terminal device supports performing quality of experience measurement and collection on the first service. The first access network device determines, based on the capability information of the terminal device, that the terminal device supports performing quality of experience measurement and collection on the first service.

Based on at least one embodiment, the access network device learns, by exchanging signaling with the terminal device, that the terminal device supports performing quality of experience measurement and collection on the first service. This is simple and feasible.

In at least one embodiment, with reference to any one of the first aspect or at least one embodiment involving the first aspect, before receiving the capability information from the terminal device, the first access network device sends first query information to the terminal device. The first query information is used to obtain the capability information of the terminal device.

Based on at least one embodiment, the access network device requests the terminal device to report the capability information of the terminal device, so that the terminal device reports the capability information of the terminal device after receiving the request of the access network device, to avoid power consumption caused by the terminal device reporting the capability information of the terminal device in advance or periodically, and reduce power consumption of the terminal device.

In at least one embodiment, with reference to any one of the first aspect or at least one embodiment involving the first aspect, the type of the first service and the indicator of quality of experience of the first service are sent by a second access network device or a core network device to the first access network device. Alternatively, the type of the first service and the indicator of quality of experience of the first service are configured by a control device in the first access network device.

Based on at least one embodiment, the type of the first service and the indicator of quality of experience of the first service is configured for the first access network device by using another access network device, core network device, or control device that manages the first service, to improve accuracy of configuring the indicator of quality of experience.

In at least one embodiment, with reference to any one of the first aspect or at least one embodiment involving the first aspect, the first access network device includes a centralized unit (centralized unit, CU) and a distributed unit (distributed unit, DU). The CU of the first access network device sends the application layer measurement configuration to the terminal device. The CU of the first access network device receives the application layer measurement report from the terminal device. The CU of the first access network device sends the application layer measurement report to the DU of the first access network device.

Based on at least one embodiment, the measurement method in at least one embodiment is applied to a CU-DU split scenario, to improve flexibility and extensiveness of the measurement method.

According to a second aspect, a measurement apparatus is provided. The measurement apparatus is used in a first access network device or a chip or a system-on-a-chip in the first access network device, or is a function module that is in the first access network device and that is configured to implement the method according to any one of the first aspect or at least one embodiment involving the first aspect. The measurement apparatus implements functions performed by the first access network device in the foregoing aspects or at least one embodiment, and the functions is implemented by hardware executing corresponding software. The hardware or the software includes one or more modules corresponding to the foregoing functions. For example, the measurement apparatus includes a communication unit.

The communication unit is configured to send, to a terminal device, an application layer measurement configuration used to indicate the terminal device to perform quality of experience measurement and collection on a first service. The application layer measurement configuration includes a type of the first service and an indicator of quality of experience of the first service. The type of the first service includes one or more of AR, VR, and 5GMS.

The communication unit is further configured to receive, from the terminal device, an application layer measurement report that includes the type of the first service and a value corresponding to the indicator of quality of experience of the first service.

For a specific implementation of the measurement apparatus, refer to behavior and a function of the terminal device in the measurement method provided in any one of the first aspect or the designs of the first aspect. Details are not repeated herein again. Therefore, the provided measurement apparatus achieves same beneficial effects as any one of the first aspect or the designs of the first aspect.

According to a third aspect, a measurement apparatus is provided. The measurement apparatus is a first access network device or a chip or a system-on-a-chip in the first access network device. The measurement apparatus implements functions performed by the first access network device in the foregoing aspects or the designs. The functions is implemented by hardware. For example, in at least one embodiment, the measurement apparatus includes a processor and a communication interface. The processor is configured to support the measurement apparatus in implementing the functions in any one of the first aspect or the designs of the first aspect. For example, the processor is configured to send, to a terminal device through the communication interface, an application layer measurement configuration used to indicate the terminal device to perform quality of experience measurement and collection on a first service. The application layer measurement configuration includes a type of the first service and an indicator of quality of experience of the first service. The type of the first service includes one or more of AR, VR, and 5GMS.

In at least one embodiment, the measurement apparatus further includes a memory. The memory is configured to store computer-executable instructions and data used for the measurement apparatus. In response to the measurement apparatus running, the processor executes the computer-executable instructions stored in the memory, so that the measurement apparatus is enabled to perform the measurement method according to any one of the first aspect or the designs of the first aspect.

According to a fourth aspect, a computer-readable storage medium is provided. The computer-readable storage medium is a readable non-volatile storage medium. The computer-readable storage medium stores computer instructions or a program. In response to the computer instructions or the program being run on a computer, the computer is enabled to perform the measurement method according to any one of the first aspect or the designs of the foregoing aspect.

According to a fifth aspect, a computer program product including instructions is provided. In response to the computer program product running on a computer, the computer is enabled to perform the measurement method according to any one of the first aspect or the designs of the foregoing aspect.

According to a sixth aspect, a measurement apparatus is provided. The measurement apparatus is a first access network device or a chip or a system-on-a-chip in the first access network device. The measurement apparatus includes one or more processors and one or more memories. The one or more memories are coupled to the one or more processors, and the one or more memories are configured to store computer program code. The computer program code includes computer instructions. In response to the one or more processors executing the computer instructions, a terminal device is enabled to perform the measurement method according to any one of the first aspect or at least one embodiment involving the first aspect.

According to a seventh aspect, a chip system is provided. The chip system includes a processor and a communication interface. The chip system is configured to implement functions performed by a terminal device according to any one of the first aspect or at least one embodiment involving the first aspect. For example, the processor is configured to send, to the terminal device through the communication interface, an application layer measurement configuration used to indicate the terminal device to perform quality of experience measurement and collection on a first service. The application layer measurement configuration includes a type of the first service and an indicator of quality of experience of the first service. The type of the first service includes one or more of AR, VR, and 5GMS. In at least one embodiment, the chip system further includes a memory. The memory is configured to store program instructions and/or data. The chip system includes a chip, or includes a chip and another discrete component. This is not limited herein.

For technical effects achieved by any one of the designs of the second aspect to the seventh aspect, refer to the technical effects achieved by any one of the first aspect or at least one embodiment involving the first aspect. Details are not described again.

According to an eighth aspect, a measurement method is provided. The measurement method includes: A terminal device receives an application layer measurement configuration from a first access network device. The application layer measurement configuration includes a type of a first service and an indicator of quality of experience of the first service. The type of the first service includes one or more of AR, VR, and 5GMS. The terminal device performs quality of experience measurement and collection on the first service based on the application layer measurement configuration, to obtain an application layer measurement report that includes the type of the first service and a value corresponding to the indicator of quality of experience of the first service. The terminal device sends the application layer measurement report to the first access network device.

According to the method described in the eighth aspect, in response to receiving the application layer measurement configuration from the first access network device, the terminal device performs quality of experience measurement and collection on the first service based on the application layer measurement configuration, and send the application layer measurement report to the first access network device, so that a network side optimizes a wireless network based on the value corresponding to the indicator of quality of experience in the application layer measurement report. Therefore, an optimized wireless network provides transmission of the service, to improve user experience in response to a user using the first service.

In at least one embodiment, the terminal device sends capability information of the terminal device to the first access network device. The capability information is used to indicate that the terminal device supports performing quality of experience measurement and collection on the first service.

Based on at least one embodiment, with reference to the eighth aspect, the terminal device sends the capability information of the terminal device to the first access network device, to avoid a problem caused because the terminal device still receives the application layer measurement configuration from the first access network device in response to the terminal device not supporting performing quality of experience measurement and collection on the first service/ does not have a capability of performing quality of experience measurement and collection on the first service, and improve accuracy of performing quality of experience measurement and collection on the first service by the terminal device.

In at least one embodiment, with reference to any one of the eighth aspect or at least one embodiment involving the eighth aspect, the terminal device receives, from the first access network device, first query information that is used to obtain the capability information of the terminal device.

Based on at least one embodiment, the terminal device reports the capability information of the terminal device after receiving a request of the access network device, so that the terminal device avoids power consumption caused by reporting the capability information of the terminal device in advance or periodically, and reduce power consumption of the terminal device.

According to a ninth aspect, a measurement apparatus is provided. The measurement apparatus is used in a terminal device or a chip or a system-on-a-chip in the terminal device; or is a function module that is in the terminal device and that is configured to implement the method according to any one of the eighth aspect or the designs of the eighth aspect. The measurement apparatus implements functions performed by the terminal device in the foregoing aspects or the designs, and the functions is implemented by hardware executing corresponding software. The hardware or the software includes one or more modules corresponding to the foregoing functions. For example, the measurement apparatus includes a communication unit and a processing unit.

The communication unit is configured to receive, from a first access network device, an application layer measurement configuration that includes a type of a first service and an indicator of quality of experience of the first service. The type of the first service includes one or more of AR, VR, and 5GMS.

The processing unit is configured to perform quality of experience measurement and collection on the first service based on the application layer measurement configuration, to obtain an application layer measurement report that includes the type of the first service and a value corresponding to the indicator of quality of experience of the first service. The communication unit is further configured to send the application layer measurement report to the first access network device.

In at least one embodiment, the communication unit is further configured to send capability information of the terminal device to the first access network device. The capability information is used to indicate that the terminal device supports performing quality of experience measurement and collection on the first service.

In at least one embodiment, the communication unit is further configured to receive, from the first access network device, first query information that is used to obtain the capability information of the terminal device.

According to a tenth aspect, a measurement apparatus is provided. The measurement apparatus is a terminal device or a chip or a system-on-a-chip in the terminal device. The measurement apparatus implements functions performed by the terminal device in the foregoing aspects or the designs. The functions is implemented by hardware. For example, in a design, the measurement apparatus includes a processor and a communication interface. The communication interface is coupled to the processor. The processor is configured to run a computer program or instructions, to implement the measurement method according to any one of the eighth aspect and at least one embodiment involving the eighth aspect.

According to an eleventh aspect, a computer-readable storage medium is provided. The computer-readable storage medium is a readable non-volatile storage medium. The computer-readable storage medium stores computer instructions or a program. In response to the computer instructions or the program being run on a computer, the computer is enabled to perform the measurement method according to any one of the eighth aspect or the at least one embodiment involving the eighth aspect.

According to a twelfth aspect, a computer program product including instructions is provided. In response to the computer program product running on a computer, the computer is enabled to perform the measurement method according to any one of the eighth aspect or at least one embodiment involving the eighth aspect.

According to a thirteenth aspect, a measurement apparatus is provided. The measurement apparatus is a first access network device or a chip or a system-on-a-chip in the first access network device. The measurement apparatus includes one or more processors and one or more memories. The one or more memories are coupled to the one or more processors, and the one or more memories are configured to store computer program code. The computer program code includes computer instructions. In response to the one or more processors executing the computer instructions, a terminal device is enabled to perform the measurement method according to any one of the eighth aspect or at least one embodiment involving the eighth aspect.

According to a fourteenth aspect, a chip is provided, and includes a processor and a communication interface. The processor is coupled to a memory through the communication interface. In response to the processor executing a computer program or instructions in the memory, the measurement method according to any one of the eighth aspect and at least one embodiment involving the eighth aspect is performed.

For technical effects achieved by any one of the designs of the ninth aspect to the fourteenth aspect, refer to the technical effects achieved by any one of the eighth aspect or at least one embodiment involving the eighth aspect. Details are not described again.

According to a fifteenth aspect, at least one embodiment provides a communication system, including a first access network device and a terminal device that communicates with the first access network device. The first access network device is configured to perform the measurement method according to any one of the first aspect and at least one embodiment involving the first aspect. The terminal device is configured to perform the measurement method according to any one of the eighth aspect and at least one embodiment involving the eighth aspect.

DESCRIPTION OF EMBODIMENTS

Figure 1:
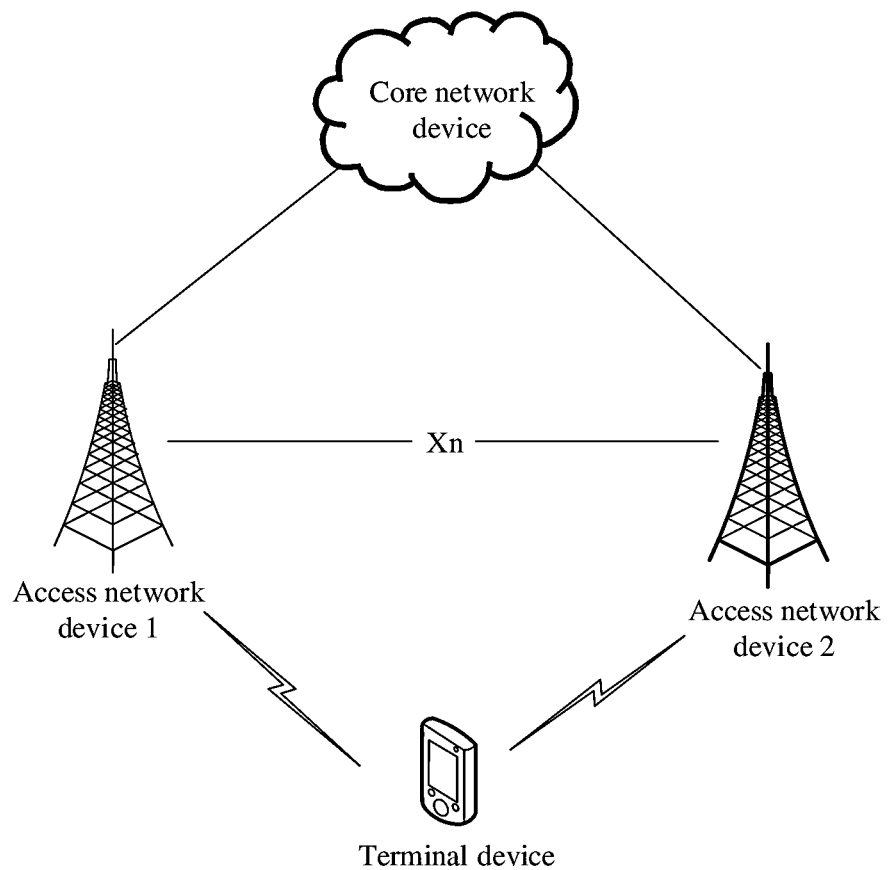
FIG. 1 is a simplified schematic diagram of a communication system according to at least one embodiment.

In at least one embodiment, the word "example", "for example", or the like is used to represent giving an example, an illustration, or a description. Any embodiment or design scheme described as an "example" or "for example" in at least one embodiment is not more preferred or have more advantages than another embodiment or design scheme. Exactly, use of the word "example" or "for example" is intended to present a related concept in a specific manner.

The following terms "first" and "second" are merely intended for a purpose of description, and shall not be understood as an indication or implication of relative importance or implicit indication of a number of indicated technical features. Therefore, a feature limited by "first" or "second" explicitly or implicitly includes one or more features. In the descriptions of at least one embodiment, "a plurality of" means two or more than two unless otherwise specified.

Before describing embodiments, terms used herein are explained and described.

AR is a technology that integrates virtual information with the real world. The AR provides a user with additional information superimposed in a current user environment, a human generated item, or human generated content. The additional information or the human generated item or content is usually visible and/or audible. Observation on the current environment is direct or indirect. "Direct" means that there is no intermediate sensing, processing, and rendering. "Indirect" means that perception of the environment is relayed by using a sensor and is enhanced or processed.

VR is a technology that integrates a computer, electronic information, and a simulation technology. A basic implementation of the VR is that the computer simulates a virtual environment, to give a sense of environment immersion to a person. The VR is a delivery of rendered versions of visual and audio scenes. In response to a user moving within a limitation specified by an application, a rendering program is designed to mimic as naturally as possible visual and auditory sensational stimuli of the real world.

5GMS: A medium that transmits a time relation is used as a main medium. 5GMS points to a fact that a medium is mainly sent and consumed in a single direction, and the medium is received by a peer end. In addition, content of the medium is streamed during production.

A service that is described in at least one embodiment is intended to describe the technical solutions in at least one embodiment more clearly, but constitute no limitation on the technical solutions provided in at least one embodiment. A person of ordinary skill in the art knows that, with evolution of a network architecture and emergence of another emerging service, the technical solutions provided in at least one embodiment are also applicable to similar technical problems.

In at least one embodiment, to improve user experience in response to a user using an emerging service such as AR, VR, or 5GMS, a measurement method is provided, and includes: An access network device sends an application layer measurement configuration to a terminal device. The application layer measurement configuration is used to indicate the terminal device to perform quality of experience measurement and collection on one or more of the AR, the VR, and the 5GMS. The application layer measurement configuration includes an indicator of quality of experience of the one or more services of the AR, the VR, and the 5GMS. After obtaining an application layer measurement report based on the application layer measurement configuration, the terminal device sends the application layer measurement report to the access network device. Correspondingly, the access network device receives, from the terminal device, the application layer measurement report that includes a value corresponding to the indicator of quality of experience of the one or more services of the AR, the VR, and the 5GMS. The access network device performs, based on the value corresponding to the indicator of quality of experience in the application layer measurement report, network optimization on a wireless network used to transmit the service, so that an optimized wireless network provides transmission of the service.

In at least one embodiment, quality of experience (quality of experience, QoE) measurement and collection means collection of an experience status in response to the user using a service on a terminal device. The quality of experience measurement and collection is also referred to as application layer measurement and collection, application layer measurement, quality of experience measurement, or the like.

The indicator of quality of experience of the service includes a performance parameter of the terminal device that uses the service and/or quality of experience of the user on the service of the terminal device in response to the user using the service on the terminal device. In at least one embodiment, the quality of experience is alternatively described as user experience, customer experience, or the like. This is not limited.

For example, the indicator of quality of experience of the AR or the VR is shown in Table 1, and includes: video bitrate, a video frame rate, resolution-horizontal, resolution-vertical, screen resolution-horizontal, a screen refresh rate, a number of video channels, video codec, a field of view, audio bitrate, a number of audio channels, audio codec, an audio sampling rate, asynchronous time, re-buffering time, a re-buffering frequency, a packet loss rate, a black edge rate, a head motion to photons latency, a head motion to sound latency, a body motion to photons latency, an operation response delay, a degree of freedom, spatial interaction, video quality, audio quality, interactive response quality, spatial interaction quality, immersion experience quality, presenting experience quality, interactive experience quality, and a mean opinion score. For a description of an indicator of quality of experience, refer to Table 1. Details are not described.

TABLE 1

| No. | Indicator of quality of experience | Description of the indicator of quality of experience |
| --- | --- | --- |
| 1 | Video bitrate (video bitrate) | Volume of video data transmitted per unit of time |
| 2 | Video frame rate (video frame rate) | Number of video/game frames displayed on a terminal device per second |
| 3 | Resolution-horizontal (resolution-horizontal) | Number of video/game pixels displayed on the terminal device in a horizontal direction |
| 4 | Resolution-vertical (resolution-vertical) | Number of video/game pixels displayed on the terminal device in a vertical direction |
| 5 | Screen resolution-horizontal (screen resolution-horizontal) | Number of pixels in a monocular screen of a head-mounted visualized device in a horizontal direction |
| 6 | Screen refresh rate (screen refresh rate) | Number of screen refresh times per second of the head-mounted visualized device |
| 7 | Number of video channels (number of video channels) | Monocular vision or stereoscopic vision |
| 8 | Video codec (video codec) | Video codec standards, such as H.265/HEVC, H.264/AVC, VP9, and AVS2/3 |
| 9 | Field of view (field of view) | Monocular field of view of a head-mounted visualized terminal device in a horizontal direction |
| 10 | Audio bitrate (audio bitrate) | Volume of audio data transmitted per unit of time |
| 11 | Number of audio channels (number of audio channels) | Stereo sound, surround sound, or spatialized sound |
| 12 | Audio codec (audio codec) | Audio codec standards, such as AAC-LC, Opus, and DD+ |
| 13 | Audio sampling rate (audio sampling rate) | Frequency of audio sampling |
| 14 | Asynchronous time (asynchronous time) | Audio and video synchronization latency of a video/game |
| 15 | Re-buffering time (re-buffering time) | Average re-buffering time during video watching or game playing |
| 16 | Re-buffering frequency (re-buffering frequency) | Ratio of a number of re-buffering times to total duration of video or game playing in response to the terminal device playing a video or a game |
| 17 | Packet loss rate (packet loss rate) | Application packet loss rate of the terminal device |
| 18 | Black edge rate (black edge rate) | Proportion of black edges to an image in secondary rendering in response to a head of a user rotates or moves |
| 19 | Head motion to photons latency (head motion to photons latency) | Lapse between a user head rotation and an image refresh |
| 20 | Head motion to sound latency (head motion to sound latency) | Lapse between a user head rotation and an audio direction change |
| 21 | Body motion to photons latency (body motion to photons latency) | Lapse between a user body motion and body movement in an image refresh |
| 22 | Operation response delay (operation response delay) | Lapse between a user operation and an operation response |

TABLE 1-continued

| No. | Indicator of quality of experience | Description of the indicator of quality of experience |
|---|---|---|
| 23 | Degree of freedom (degree of freedom) | Number of spatial dimensions supported by an application system of the terminal device for interaction and operation, which is represented by a number of nodes (such as the head, hand, and body) that support interaction and a number of interaction dimensions supported by a node |
| 24 | Spatial interaction accuracy (spatial interaction accuracy) | Spatial error of interactions, such as user head tracking, motion capturing, gesture recognition, and direction tracking |
| 25 | Video quality (video quality) | Score of a user for quality of video image fidelity |
| 26 | Audio quality (audio quality) | Score of the user for quality of audio fidelity |
| 27 | Interactive response quality (interactive response quality) | Score of the user for quality of an interaction latency |
| 28 | Spatial interaction quality (spatial interaction quality) | Score of the user for quality of the degree of freedom and interaction accuracy |
| 29 | Immersion experience quality (immersion experience quality) | Score of the user for quality of image and audio fidelity and immersion experience |
| 30 | Presenting experience quality (presenting experience quality) | Score of the user for quality of VR or AR experience, where the quality is used to represent network transmission quality, such as a packet loss and a latency |
| 31 | Interactive experience quality (interactive experience quality) | Score of the user for fidelity of interaction between VR or AR content and a VR device or an AR device |
| 32 | Mean opinion score (mean opinion score) | Comprehensive score of the user for quality of VR or AR experience |

The indicator of quality of experience of the AR or the VR includes one or more of the indicators of quality of experience in Table 1. The user in Table 1 is a user who uses the terminal device, and is also referred to as a "customer". The terminal device is a device that supports the AR or the VR. The terminal device is referred to as an AR device or a VR device. In addition, Table 1 is merely an example table. In addition to the indicators of quality of experience shown in Table 1, another indicator of quality of experience is further included. This is not limited.

The indicators of quality of experience whose sequence numbers are 1 to 24 in Table 1 are performance parameters of the terminal device, for example, is performance parameters of hardware or software configured in the terminal device. Values of the indicators of quality of experience are preconfigured or set at delivery. The values of the indicators of quality of experience are corresponding to features of the hardware or software configured in the terminal device, and are the performance parameters of the hardware or software. The screen resolution-horizontal whose sequence number is 5 in Table 1 is used as an example. The screen resolution-horizontal of the terminal device is related to firmware such as a graphics card and a display of the terminal device. The screen resolution-horizontal of the terminal device is feature parameters of the graphics card and the display of the terminal device. Better performance of the graphics card and the display of the terminal device indicates higher screen resolution-horizontal.

The indicators of quality of experience whose sequence numbers are 25 to 32 in Table 1 are quality of experience of the user on the AR or the VR of the terminal device in response to the user using the AR or the VR on the terminal device. Values corresponding to the indicators of quality of experience is determined based on a usage status of the user. The values of the indicators of quality of experience are obtained by performing quality of experience measurement and collection on the AR or the VR.

For example, the indicator of quality of experience of the 5GMS is shown in Table 2, and includes corruption duration, a successive loss of real-time transport protocol packet, a frame rate, jitter duration, synchronization loss duration, round-trip time, average codec bitrate, and codec information. For a description of each indicator of quality of experience, refer to Table 2. Details are not described.

TABLE 2

| No. | Indicator of quality of experience | Description of the indicator of quality of experience |
|---|---|---|
| 1 | Corruption duration (corruption duration) | Interval between network time protocol time of the last good frame that is used before video corruption occurs and network time protocol time of the first subsequent good frame |
| 2 | Successive loss of real-time transport protocol packets (successive loss of real-time transport protocol packets) | Number of the real-time transport protocol packets that are successively lost on one or more media channels of a terminal device |
| 3 | Frame rate (frame rate) | A play frame rate, which is equal to a value obtained after a number of frames displayed in a measurement resolution periodicity is divided by a time length with a unit of seconds |

TABLE 2-continued

| No. | Indicator of quality of experience | Description of the indicator of quality of experience |
|---|---|---|
| 4 | Jitter duration (jitter duration) | In response to an absolute difference between actual play time and expected play time being greater than a jitter threshold, a video stream jitters, and the jitter threshold is the jitter duration, where the expected play time = actual play time of a previous frame + network time protocol time of a current frame-network time protocol time of the previous frame |
| 5 | Synchronization loss duration (sync loss duration) | In response to an absolute difference between a value A and a value B being greater than a synchronization threshold, synchronization loss occurs, and the synchronization threshold is the synchronization loss duration, where the value A indicates a difference between play time of the last play frame of a video stream and play time of the last play frame of an audio stream, and the value B indicates a difference between expected play time of the last play frame of the video stream and expected play time of the last play frame of the audio stream |
| 6 | Round-trip time (round-trip time) | Round-trip time at a real-time transport protocol level plus an extra two-way latency caused by buffering and other processing on a client of the terminal device |
| 7 | Average codec bitrate (average codec bitrate) | A rate used by the terminal device to encode and decode active media information within statistical duration, where the active media information means a video stream played by the terminal device |
| 8 | Codec information (codec information) | Media codec information used by a terminal device in a receiving direction within statistical duration |

The indicator of quality of experience of the 5GMS includes one or more indicators of quality of experience in Table 2. The terminal device in Table 2 is a device supporting the 5GMS. The terminal device is referred to as a 5GMS device. In addition, Table 2 is merely an example table. In addition to the indicators of quality of experience shown in Table 2, another indicator of quality of experience of the 5GMS is further included. This is not limited.

The indicators of quality of experience in Table 2 are quality of experience of the user on the 5GMS of the terminal device in response to the user using the 5GMS on the terminal device. Values of the indicators of quality of experience is determined based on a usage status of the user. The values of the indicators of quality of experience is obtained by performing quality of experience measurement and collection on the 5GMS.

The following describes implementations of at least one embodiment in detail with reference to the accompanying drawings.

The measurement method is applied to any communication system that supports communication. The communication system is a 3rd Generation Partnership Project (3rd generation partnership project, 3GPP) communication system, for example, a 5G mobile communication system, a new radio (new radio, NR) system, an NR vehicle-to-everything (vehicle-to-everything, V2X) system, or another next-generation communication system, or is a non-3GPP communication system. This is not limited. The following uses FIG. 1 as an example to describe the measurement method.

FIG. 1 is a simplified schematic diagram of a communication system according to at least one embodiment. As shown in FIG. 1, the communication system includes a core network device, an access network device 1, an access network device 2, and a terminal device.

The terminal device is communicatively connected to the access network device 1 and/or the access network device 2. The terminal device is communicatively connected to the core network device by using the access network device 1 and/or the access network device 2. The terminal device is located within a coverage area of the access network device 1 and/or a coverage area of the access network device 2. For example, the terminal device is located in an overlapping area between the coverage area of the access network device 1 and the coverage area of the access network device 2. Alternatively, the terminal device is located within the coverage area of the access network device 1, and located outside the coverage area of the access network device 2. Alternatively, the terminal device is located outside the coverage area of the access network device 1, and located within the coverage area of the access network device 2. Different access network devices is communicatively connected through an Xn interface.

In response to the terminal device communicating with the access network device 1 and the access network device 2, in other words, the communication system is a multi-radio dual connectivity (multi-radio dual connectivity, MR-DC) communication system, one of the access network device 1 and the access network device 2 is a master access network device, and the other access network device is a secondary access network device. For example, in the following embodiment, an example in which a first access network device (the access network device 1) is a secondary access network device, and a second access network device (the access network device 2) is a master access network device is used for description. In a scenario in which the communication system is the MR-DC communication system, the access network device 1 and the access network device 2 is access network devices of different communication standards, or is access network devices of a same communication standard. This is not limited.

The core network device in FIG. 1 is a device or an entity in a 5G core (5th generation core, 5GC) network, for example, an access and mobility management function (access and mobility management function, AMF). Alternatively, the core network device is a device or an entity in a 4G core network (for example, an evolved packet core (evolved packet core, EPC)), for example, a mobility management entity (mobility management entity, MME). The core network device is responsible for functions such as access control, mobility management, attachment and detachment, and gateway selection.

The terminal device in FIG. 1 is referred to as a terminal, or is referred to as user equipment (user equipment, UE), an access terminal device, a subscriber unit, a subscriber station, a mobile station, a remote station, a remote terminal device, a mobile device, a user terminal device, a wireless communication device, a user agent, a user apparatus, or the like. The terminal device is a wireless terminal device or a wired terminal device. The wireless terminal device is a device having a wireless transceiver function, and is deployed on land, including an indoor or outdoor device, a handheld device, or a vehicle-mounted device; or is deployed on water (for example, on a ship); or is deployed in the air (for example, on an airplane, a balloon, or a satellite). The terminal device is an unmanned aerial vehicle, an Internet of Things (internet of things, IoT) device (for example, a sensor, an electricity meter, or a water meter), a vehicle-to-everything (vehicle-to-everything, V2X) device, a station (station, ST) in a wireless local area network (wireless local area network, WLAN), a cellular phone, a cordless phone, a session initiation protocol (session initiation protocol, SIP) phone, a wireless local loop (wireless local loop, WLL) station, a personal digital assistant (personal digital assistant, PDA) device, a handheld device with a wireless communication function, a computing device or another processing device connected to a wireless modem, a vehicle-mounted device, or a wearable device (which is also referred to as a wearable intelligent device). The wearable device is a head-mounted visualized device, for example, a VR helmet, VR glasses, an AR helmet, or AR glasses. The terminal device is alternatively a terminal device in a next-generation communication system, for example, a terminal device in a 5G communication system, a terminal device in a future evolved public land mobile network (public land mobile network, PLMN), or a terminal device in an NR communication system. This is not limited herein.

The access network device in FIG. 1 is mainly configured to implement functions such as resource scheduling, radio resource management, and radio access control of the terminal device. Specifically, the access network device includes any node of a small base station, a radio access point, a transmission reception point (transmission reception point, TRP), a transmission point (transmission point, TP), a next-generation NodeB (generation NodeB, gNB), and another access node. In at least one embodiment, an apparatus configured to implement the functions of the access network device is the access network device, or is an apparatus that supports the access network device in implementing the functions, for example, a chip system. The apparatus is installed in the access network device. The technical solutions provided in at least one embodiment are described by using an example in which the apparatus configured to implement the functions of the access network device is the access network device and the access network device is a base station.

Figure 2:
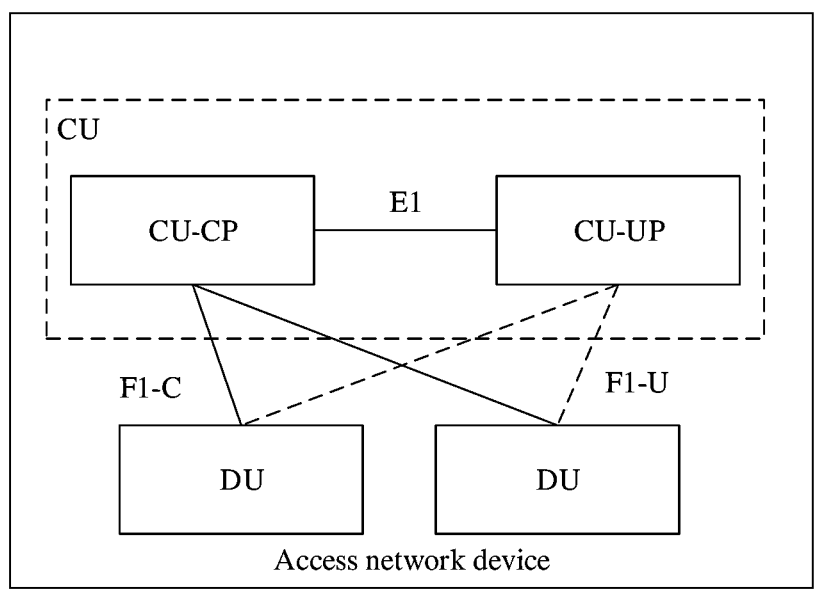
FIG. 2 is a schematic diagram of an architecture of a CU-DU split access network device in a communication system according to at least one embodiment.

As shown in FIG. 2, the access network device is an access network device in which a centralized unit (centralized unit, CU) and a distributed unit (distributed unit, DU) are split. As shown in FIG. 2, one access network device includes one CU and two DUs. Further, one CU includes one centralized unit control plane (CU-control plane, CU-CP) and one or more centralized unit user planes (CU-user planes, CU-UPs). For example, as shown in FIG. 2, one CU includes one CU-CP. The CU is connected to the DU through an F1 interface. The CU-CP is connected to the CU-UP through an E1 interface. The CU-CP is connected to the DU through an F1-control plane interface (F1-C). The CU-UP is connected to the DU through an F1-user plane interface (F1-U). For functions of the CU, the DU, the CU-CP, and the CU-UP, refer to the existing technology. Details are not described herein.

FIG. 1 is an example of an accompanying drawing, and a quantity of network elements shown in FIG. 1 and naming of the interfaces between the network elements in FIG. 1 are not limited. In addition to the network elements shown in FIG. 1, the communication system shown in FIG. 1 further includes another network element. This is not limited.

FIG. 2 is an example of an accompanying drawing, and a quantity of network elements shown in FIG. 2 and naming of the interfaces between the network elements in FIG. 2 are not limited.

Figure 3:
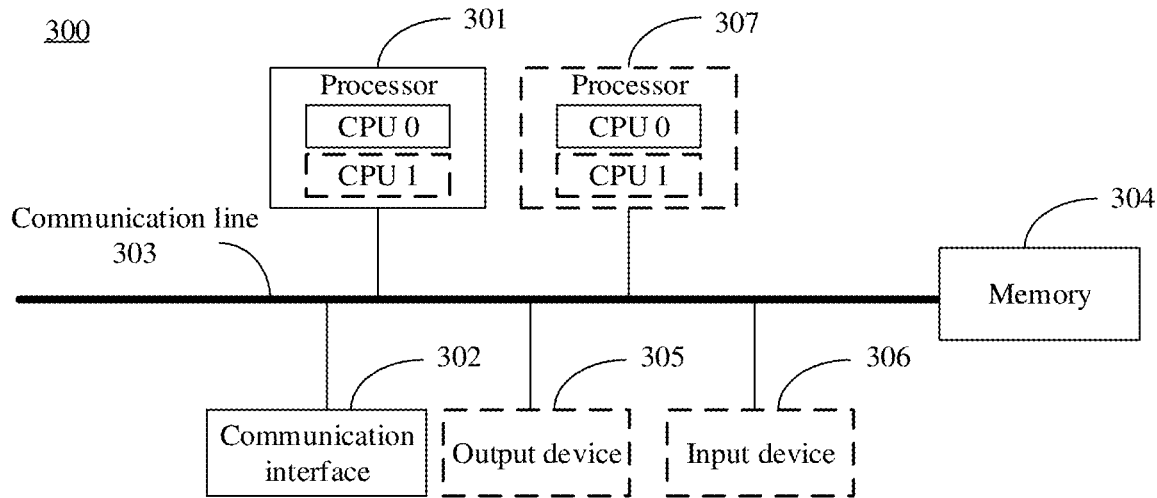
FIG. 3 is a schematic composition diagram of a measurement apparatus according to at least one embodiment.

During specific implementation, FIG. 1 is in a composition structure shown in FIG. 3 or include components shown in FIG. 3. FIG. 3 is a schematic composition diagram of a measurement apparatus 300 according to at least one embodiment. The measurement apparatus 300 is a terminal device or a chip or a system-on-a-chip in the terminal device. Alternatively, the measurement apparatus 300 is a first access network device or a chip or a system-on-a-chip in the first access network device. As shown in FIG. 3, the measurement apparatus 300 includes a processor 301, a communication interface 302, and a communication line 303.

Further, the measurement apparatus 300 includes a memory 304. The processor 301, the memory 304, and the communication interface 302 is connected to each other through the communication line 303.

The processor 301 is a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. Alternatively, the processor 301 is another apparatus having a processing function, for example, a circuit, a component, or a software module. This is not limited.

The communication interface 302 is configured to communicate with another device or another communication network. The another communication network is Ethernet, a radio access network (radio access network, RAN), a wireless local area network (wireless local area network, WLAN), or the like. The communication interface 302 is a module, a circuit, a communication interface, or any apparatus that implements communication.

The communication line 303 is configured to transmit information between components included in the measurement apparatus 300.

The memory 304 is configured to store instructions. The instructions is a computer program.

The memory 304 is a read-only memory (read-only memory, ROM) or another type of static storage device that stores static information and/or instructions, or is a random access memory (random access memory, RAM) or another type of dynamic storage device that stores information and/or instructions, an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

The memory 304 exists independently of the processor 301, or is integrated with the processor 301. The memory 304 is configured to store instructions, program code, some data, or the like. The memory 304 is located inside the measurement apparatus 300, or is located outside the measurement apparatus 300. This is not limited. The processor 301 is configured to execute the instructions stored in the memory 304, to implement the measurement methods provided in the following embodiments.

In an example, the processor 301 includes one or more CPUs, for example, a CPU 0 and a CPU 1 in FIG. 3.

In an optional implementation, the measurement apparatus 300 includes a plurality of processors. For example, in addition to the processor 301 in FIG. 3, the measurement apparatus 300 further includes a processor 307.

In an optional implementation, the measurement apparatus 300 further includes an output device 305 and an input device 306. For example, the input device 306 is a device such as a keyboard, a mouse, a microphone, or a joystick, and the output device 305 is a device such as a display or a speaker (speaker).

The measurement apparatus 300 is a desktop computer, a portable computer, a network server, a mobile phone, a tablet computer, a wireless terminal, an embedded device, a chip system, or a device with a structure similar to that in FIG. 3. In addition, the composition structure shown in FIG. 3 does not constitute a limitation on the terminal device. In addition to the components shown in FIG. 3, the terminal device includes more or fewer components than those shown in the figure, or combine some components, or have different component arrangements.

In at least one embodiment, the chip system includes a chip, or includes a chip and another discrete component.

In addition, mutual reference is made to actions, terms, and the like in at least one embodiment. This is not limited. In at least one embodiment, names of messages exchanged between devices, names of parameters in the messages, or the like are merely examples. Another name is alternatively used during specific implementation. This is not limited.

With reference to the communication system shown in FIG. 1, the following describes the measurement method provided in at least one embodiment. A first access network device, a second access network device, a core network device, and a terminal device that are described in the following embodiments have the components shown in FIG. 3. Details are not described again.

Figure 4:
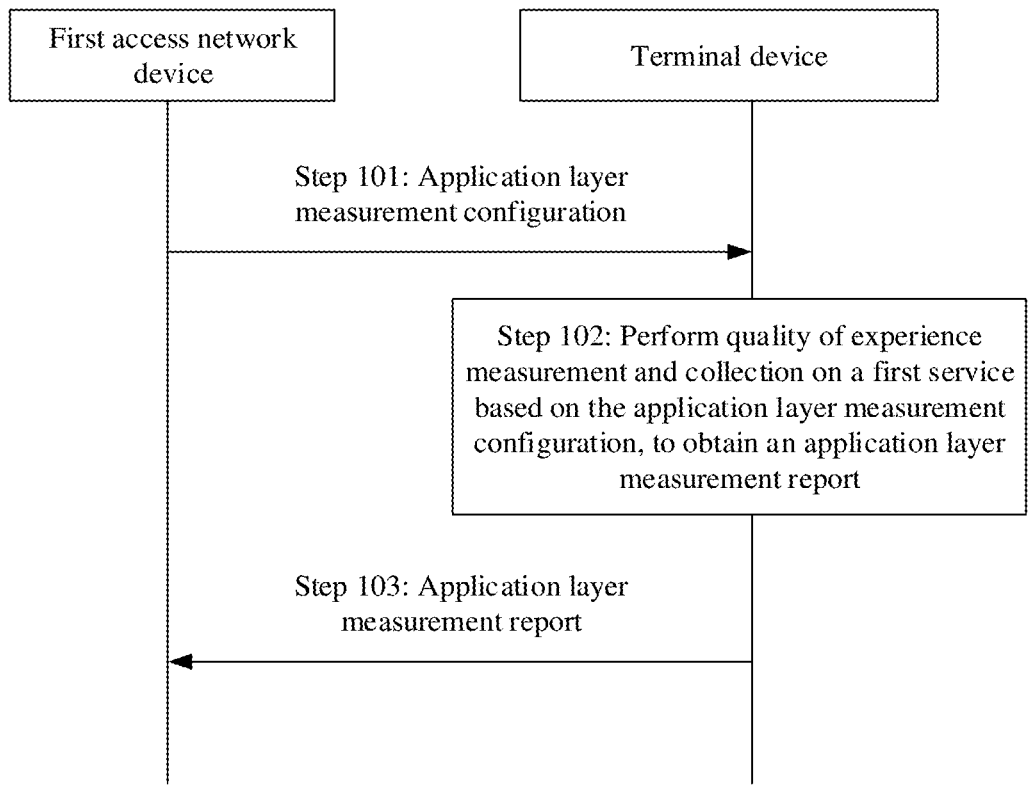
FIG. 4 is a flowchart of a measurement method according to at least one embodiment.

FIG. 4 is a flowchart of a measurement method according to at least one embodiment. As shown in FIG. 4, the method includes the following steps.

Step 101: A first access network device sends an application layer measurement configuration to a terminal device. Correspondingly, the terminal device receives the application layer measurement configuration from the first access network device.

The first access network device is any access network device in FIG. 1, for example, is the access network device 1 in FIG. 1 or the access network device 2 in FIG. 1. In at least one embodiment, an example in which the first access network device is the access network device 1 is used for description. The terminal device is the terminal device connected to the first access network device in FIG. 1. A user uses a first service on the terminal device.

The application layer measurement configuration is used to indicate the terminal device to perform quality of experience measurement and collection on the first service. The application layer measurement configuration includes a type of the first service and an indicator of quality of experience of the first service. The type of the first service is used to uniquely identify a type of service to which the first service belongs, so that the terminal device learns of, based on the type of the first service, a service whose indicator of quality of experience is to be measured.

The type of the first service includes one or more of AR, VR, and 5GMS, and further incudes another emerging service. This is not limited. For the indicator of quality of experience of the first service, refer to the foregoing description in Table 1 or Table 2. Specifically, the first access network device obtains the indicator of quality of experience of the first service from another network element by using a method shown in FIG. 8.

The type of the first service is alternatively an identifier of the first service. The identifier of the first service uniquely identifies the type of the first service. The identifier of the first service is a number or a character, or is a combination of the number and the character, or the like. This is not limited. For example, in response to the first service including the AR, an identifier of the AR is 1. In response to the first service including the VR, an identifier of the VR is 2. In response to the first service includes the 5GMS, an identifier of the 5GMS is 3.

In at least one embodiment, the first access network device sends the application layer measurement configuration to the terminal device by using a radio resource control (radio resource control, RRC) message. For example, the application layer measurement configuration is carried in the RRC message and sent to the terminal device.

The RRC message is an RRC connection reconfiguration message or an RRC connection resume message. The RRC connection reconfiguration message is referred to as an RRC reconfiguration message for short. The RRC connection resume message is referred to as an RRC resume message for short.

The first access network device alternatively sends the application layer measurement configuration to the terminal device by using another message, for example, send the application layer measurement configuration to the terminal device by using a measurement configuration application layer (MeasConfigAppLayer) message. This is not limited.

Step 102: The terminal device performs quality of experience measurement and collection on the first service based on the application layer measurement configuration, to obtain an application layer measurement report.

The application layer measurement report includes the type of the first service and a value corresponding to the indicator of quality of experience of the first service.

For example, in response to indicators of quality of experience of a service 1 being an indicator 1 of quality of experience, an indicator 2 of quality of experience, and an indicator 3 of quality of experience, a value of the indicator 1 of quality of experience of the service 1 is A1, a value of the indicator 2 of quality of experience of the service 1 is A2, and a value of the indicator 3 of quality of experience of the service 1 is A3. The application layer measurement report includes the service 1 {indicator 1 of quality of experience=A1, indicator 2 of quality of experience=A2, indicator 3 of quality of experience=A3}.

For example, that the terminal device performs quality of experience measurement and collection on the first service based on the application layer measurement configuration includes:

In response to the indicators of quality of experience are performance parameters of the terminal device, for example, the indicators of quality of experience whose sequence numbers are 1 to 24 in Table 1 and the indicators of quality of experience in Table 2, the terminal device obtains preconfigured performance parameters of the terminal device from a local storage, and include the obtained performance parameters in the application layer measurement report.

In response to the indicators of quality of experience being indicators of user evaluation on performance of the terminal device, for example, the indicators of quality of experience whose sequence numbers are 25 to 32 in Table 1, the terminal device obtains a user score in a human-computer interaction manner with the user. The human-computer interaction manner is audio interaction, user interface (user interface, UI) interface interaction, or the like.

Figure 5:
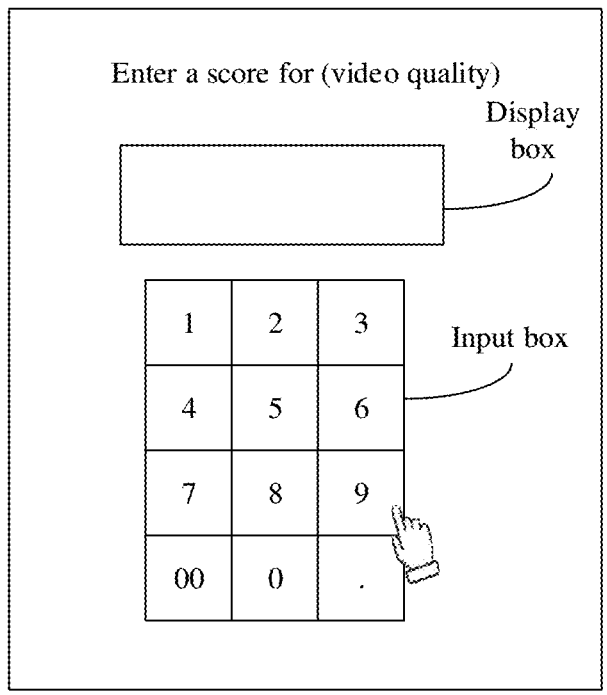
FIG. 5 is a schematic diagram of a user interface (user interface, UI) of a terminal device according to at least one embodiment.

A UI interface is used as an example. FIG. 5 shows a UI interface of the terminal device, where the interface includes a display box and an input box. The display box is used to display a user score for performance of the terminal device. The input box is used by the user to enter the score for the performance of the terminal device. The score is used to indicate an experience status in response to the user using the first service on the terminal device. In response to an entry operation of the user, the terminal device obtains the user score for the performance of the terminal device.

Further, the terminal device periodically obtains the user score for the performance of the terminal device, and perform combination processing on a plurality of scores to obtain a final user score for the performance of the terminal device, to ensure time validity and accuracy of the value of the indicator of quality of experience. The combination processing includes weighted processing, averaging processing, taking a maximum score value, taking a minimum score value, or the like, which is not limited.

For example, as shown in FIG. 5, an example in which the indicator of quality of experience is "video quality" is used. The terminal device periodically displays the UI interface shown in FIG. 5 to the user, periodically obtain user scores for video quality within a period of time, and use an average value of the scores within the period of time as a value of the video quality.

Step 103: The terminal device sends the application layer measurement report to the first access network device. Correspondingly, the first access network device receives the application layer measurement report from the terminal device.

In at least one embodiment, the terminal device sends the application layer measurement report to the first access network device by using a dedicated message. For example, the dedicated message is a measurement report application layer (MeasReportAppLayer) message.

Alternatively, the terminal device sends the application layer measurement report to the first access network device by using the RRC message. For example, the terminal device sends the application layer measurement report to the first access network device by using an RRC connection reconfiguration complete message (which is also referred to as an RRC reconfiguration complete message) or an RRC connection resume complete message (which is also referred to as an RRC resume complete message).

According to the measurement method described in at least one embodiment, for an emerging service such as the VR, the AR, or the 5GMS of the terminal device, the access network device sends, to the terminal device, the application layer measurement configuration used to indicate the terminal device to perform quality of experience measurement and collection on the emerging service, so that the terminal device measures a related indicator of quality of experience of the emerging service based on the application layer measurement configuration, to obtain an application layer measurement report of a type of the emerging service, and sends the application layer measurement report to the access network device. After receiving the application layer measurement report, the access network device performs, based on a value corresponding to the indicator of quality of experience in the application layer measurement report, network optimization on a wireless network used to transmit the service, so that an optimized wireless network provides transmission of the service, to improve user experience in response to the user using the first service.

Figure 6:
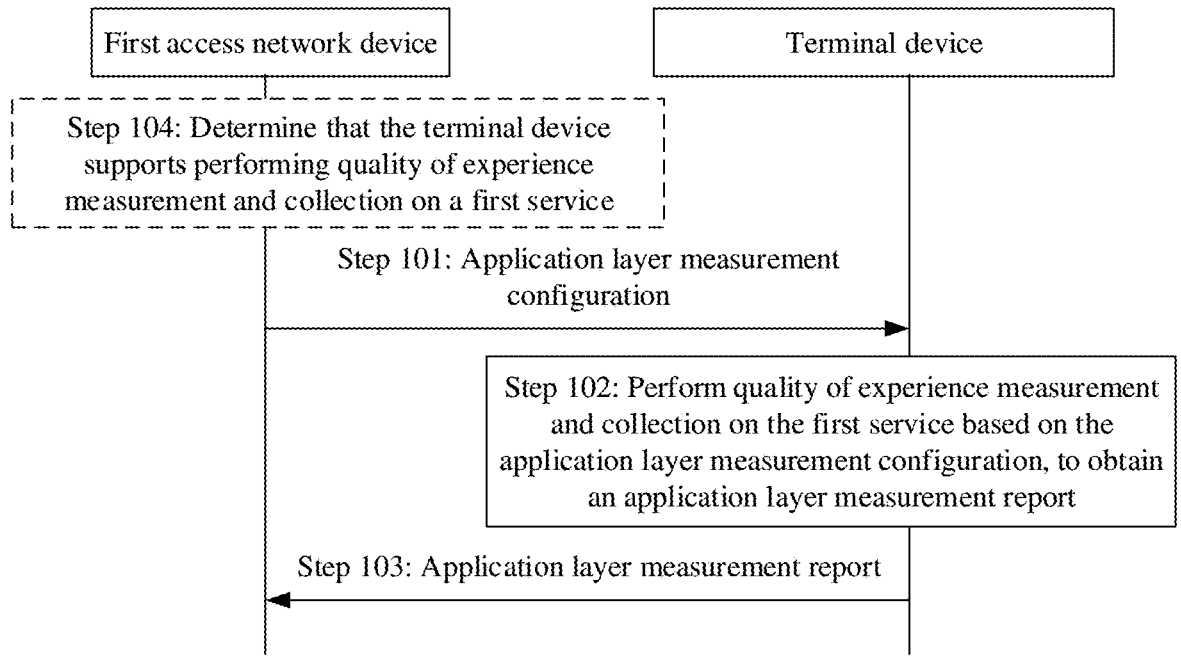
FIG. 6 is a flowchart of another measurement method according to at least one embodiment.

Based on the technical solution in FIG. 4, to improve measurement accuracy of the terminal device, as shown in FIG. 6, before step 101, the measurement method provided in at least one embodiment further includes the following step.

Step 104: The first access network device determines that the terminal device supports performing quality of experience measurement and collection on the first service.

That the terminal device supports performing quality of experience measurement and collection on the first service means that the terminal device measures the related indicator of quality of experience of the first service based on the application layer measurement configuration, to obtain the value corresponding to the indicator of quality of experience of the first service.

In at least one embodiment, the first access network device obtains capability information of the terminal device, and determines, based on the capability information, that the terminal device supports performing quality of experience measurement and collection on the first service.

The capability information includes indication information used to indicate a service on which the terminal device supports performing quality of experience measurement and collection. The indication information is used to indicate that the terminal device supports performing quality of experience measurement and collection on the first service.

In an example, the indication information includes M flag bits. One of the M flag bits is corresponding to one of M services that include the first service. In response to the indication information including one flag bit, the first access network device determines that the terminal device supports performing quality of experience measurement and collection on a service corresponding to the flag bit. In response to the indication information not including the flag bit, the first access network device determines that the terminal device does not support performing quality of experience measurement and collection on the service corresponding to the flag bit. M is an integer greater than or equal to 1.

The flag bit is a symbol or a number, or is a combination of the symbol and the number, or the like. This is not limited.

For example, a flag bit corresponding to the AR is A, a flag bit corresponding to the VR is V, and a flag bit corresponding to the 5GMS is M. In response to the indication information including "A", the first access network device determines that the terminal device supports performing quality of experience measurement and collection on the AR. In response to the indication information not including "A", the first access network device determines that the terminal device does not support performing quality of experience measurement and collection on the AR. In response to the indication information including "V", the first access network device determines that the terminal device supports performing quality of experience measurement and collection on the VR. In response to the indication information not including "V", the first access network device determines that the terminal device does not support performing quality of experience measurement and collection on the VR. In response to the indication information including "M", the first access network device determines that the terminal device supports performing quality of experience measurement and collection on the 5GMS. In response to the indication information not including "M", the first access network device determines that the terminal device does not support performing quality of experience measurement and collection on the 5GMS.

In another example, the indication information includes K bits. One of the K bits is corresponding to one of K services. In response to a value of a bit being T1, the first access network device determines that the terminal device supports performing quality of experience measurement and collection on a service corresponding to the bit. In response to a value of the bit being T2 or is not T1, the first access network device determines that the terminal device does not support performing quality of experience measurement and collection on the service corresponding to the bit. K is an integer greater than or equal to 1. T1 and T2 are integers, and T1 and T2 are different.

T1 and T2 is binary bit numbers "0" and "1" or binary bit numbers "1" and "0", or is another symbol or number, or the like. This is not limited.

For example, the indication information includes three binary bits. The three binary bits are corresponding to the 5GMS, the VR, and the AR. That the binary bit is "0" indicates that the terminal device does not support performing quality of experience measurement and collection on a service corresponding to the binary bit. That the binary bit is "1" indicates that the terminal device supports performing quality of experience measurement and collection on the service corresponding to the binary bit. In response to the indication information including 001, the first access network device determines that the terminal device supports performing quality of experience measurement and collection on the AR. In response to the indication information including 010, the first access network device determines that the terminal device supports performing quality of experience measurement and collection on the VR. In response to the indication information including 100, the first access network device determines that the terminal device supports performing quality of experience measurement and collection on the 5GMS.

In another example, the indication information is a plaintext indication. For example, the indication information is as follows:

| | |
|---|---|
| qoe-VR-MeasReport | ENUMERATED {supported} |
| //Quality of experience-VR-Measurement Report | ENUMERATED {supported}; |
| qoe-5GMS-MeasReport | ENUMERATED {supported} |
| //Quality of experience-5GMS-Measurement Report | ENUMERATED {supported}. |

The indication information is used to indicate that the terminal device supports performing quality of experience measurement and collection on the VR and the 5GMS.

In at least one embodiment, the terminal device actively sends the capability information of the terminal device to the first access network device.

For example, after setting up a communication connection to the first access network device, the terminal device actively sends the capability information of the terminal device to the first access network device. The terminal device sends the capability information of the terminal device to the first access network device by using an RRC message. The RRC message is a terminal device capability information (UECapabilityInformation) message or a handover preparation information (HandoverPreparationInformation) message. The terminal device alternatively sends the capability information of the terminal device to the first access network device by using another message. This is not limited.

Further, the terminal device periodically sends the capability information of the terminal device to the first access network device. Alternatively, the terminal device randomly sends the capability information of the terminal device to the first access network device. This is not limited.

In this way, the terminal device sends the capability information of the terminal device to the first access network device, to avoid a problem caused because the terminal device still receives the application layer measurement configuration from the first access network device in response to the terminal device not supporting performing quality of experience measurement and collection on the first service/ does not have a capability of performing quality of experience measurement and collection on the first service, and improve accuracy of performing quality of experience measurement and collection on the first service by the terminal device.

In at least one embodiment, the first access network device further obtains the capability information of the terminal device in any one of the following manner 1 to manner 3:

Manner 1: In response to the terminal device being communicatively connected to the first access network device, the first access network device obtains the capability information of the terminal device by interacting with the terminal device.

Figure 7A:
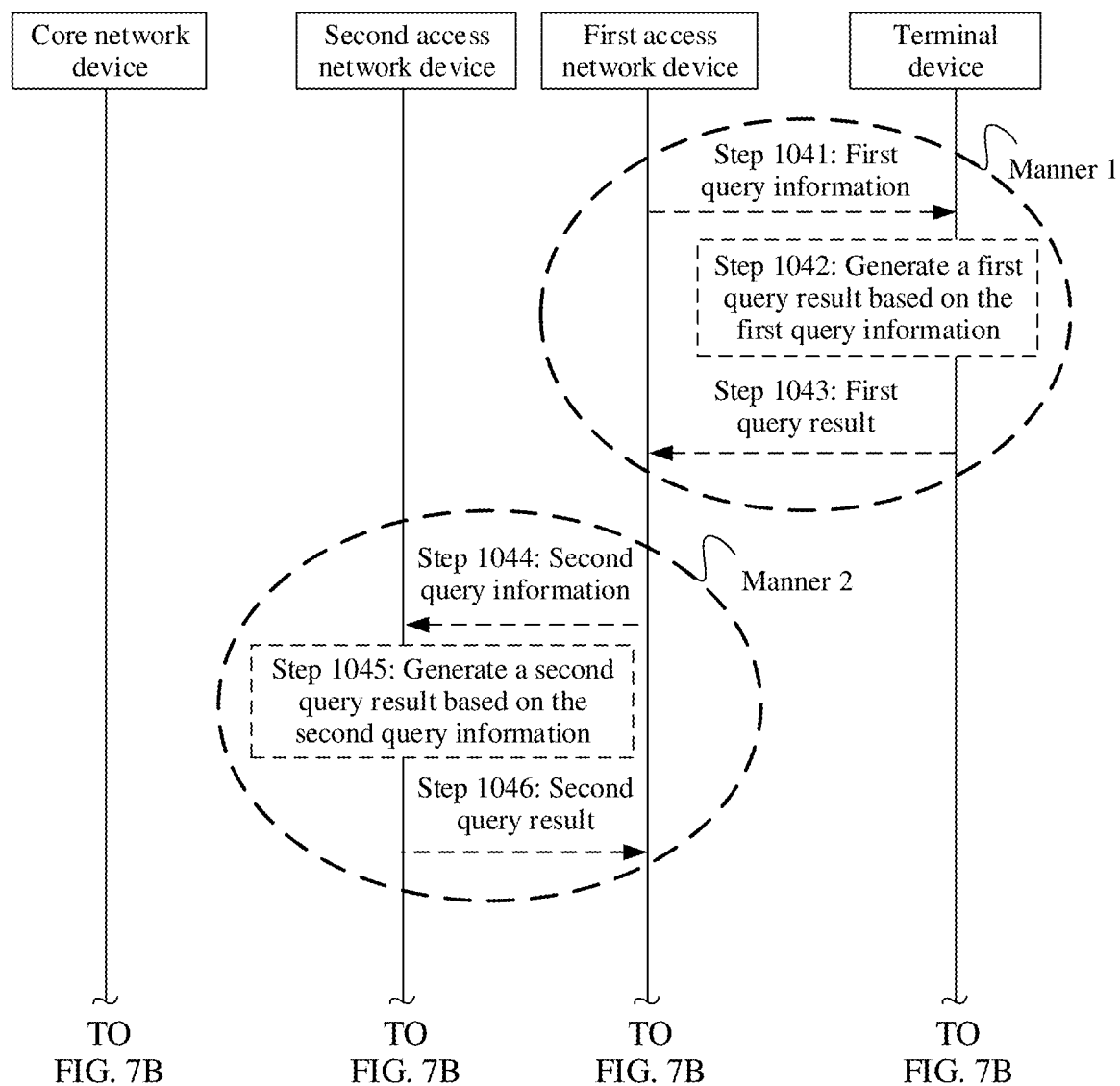
FIG. 7A and FIG. 7B are a flowchart of still another measurement method according to at least one embodiment.
Figure 7B:
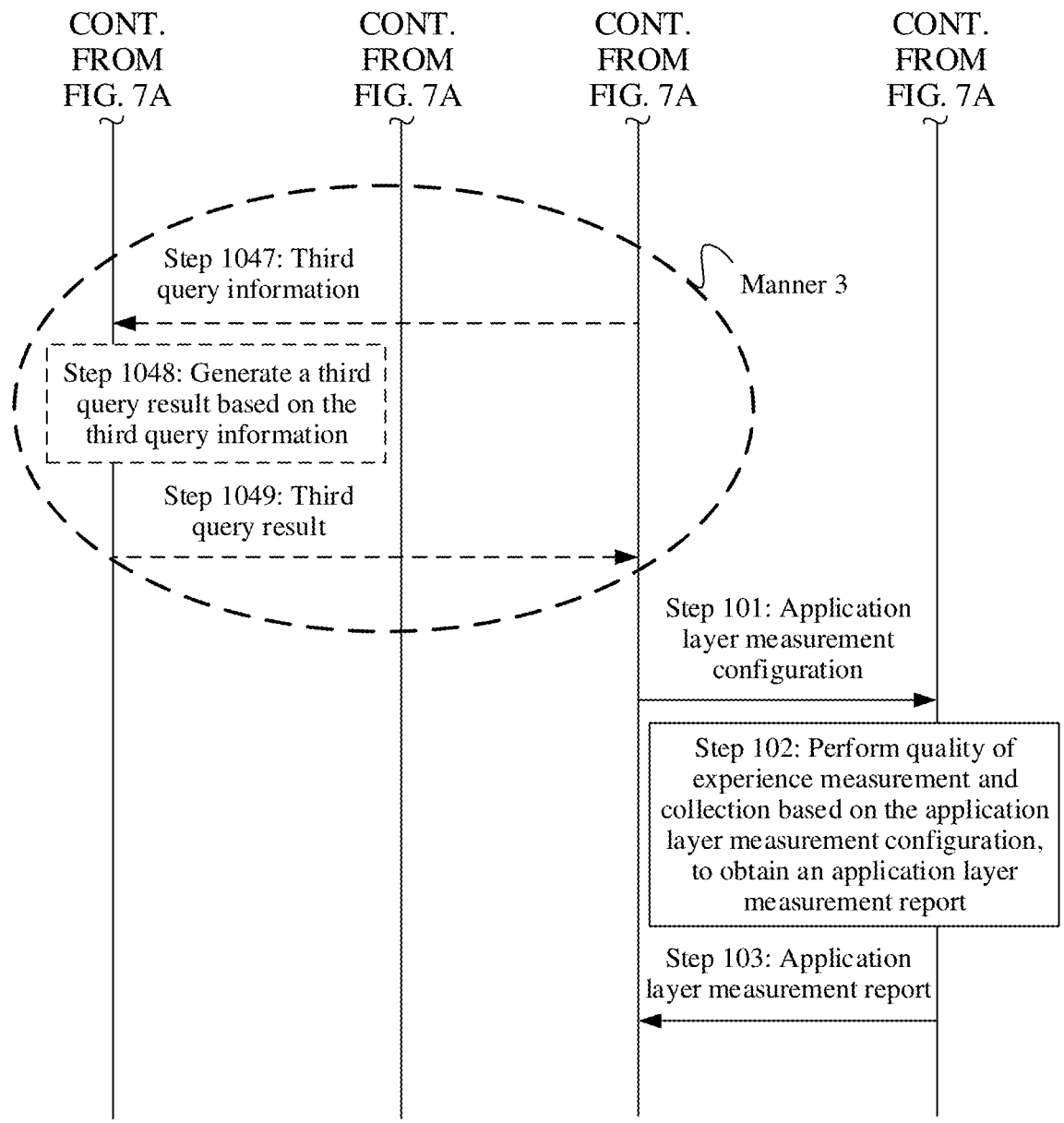

For example, refer to FIG. 7A and FIG. 7B. The manner 1 is implemented by using the following steps.

Step 1041: The first access network device sends first query information to the terminal device. Correspondingly, the terminal device receives the first query information from the first access network device.

The first query information is used to obtain the capability information of the terminal device.

Step 1042: The terminal device generates a first query result based on the first query information.

The first query result includes the capability information of the terminal device. For a description of the capability information, refer to the foregoing description. Details are not described.

Step 1043: The terminal device sends the first query result to the first access network device. Correspondingly, the first access network device receives the first query result from the terminal device.

Manner 2: In response to a second access network device having the capability information of the terminal device, the first access network device obtains the capability information of the terminal device by interacting with the second access network device.

The second access network device is the access network device 2 in the system shown in FIG. 1.

For example, refer to FIG. 7A and FIG. 7B. The manner 2 is implemented by using the following steps.

Step 1044: The first access network device sends second query information to the second access network device. Correspondingly, the second access network device receives the second query information from the access network device.

The second query information is used to obtain the capability information of the terminal device.

Step 1045: The second access network device generates a second query result based on the second query information.

The second query result and the first query result is a same query result. Details are not described herein again.

Step 1046: The second access network device sends the second query result to the first access network device. Correspondingly, the first access network device receives the second query result from the second access network device.

Manner 3: In response to a core network device having the capability information of the terminal device, the first access network device obtains the capability information of the terminal device by interacting with the core network device.

For example, refer to FIG. 7A and FIG. 7B. The manner 3 is implemented by using the following steps.

Step 1047: The first access network device sends third query information to the core network device. Correspondingly, the core network device receives the third query information from the access network device.

The third query information is used to obtain the capability information of the terminal device.

Step 1048: The core network device generates a third query result based on the third query information.

The third query result and the first query result is a same query result. Details are not described herein again.

Step 1049: The core network device sends the third query result to the first access network device. Correspondingly, the first access network device receives the third query result from the core network device.

In this way, in response to determining that the terminal device supporting performing quality of experience measurement and collection on the first service, the first access network device sends the application layer measurement configuration to the terminal device; in response to determining that the terminal device does not support performing quality of experience measurement and collection on the first service, the first access network device does not send the application layer measurement configuration to the terminal device, so that accuracy of quality of experience measurement and collection of the terminal device is improved. For example, in response to the first access network device determining that the terminal device supports performing quality of experience measurement and collection on the 5GMS, the first access network device sends, to the terminal device, an application layer measurement configuration that includes an indicator of quality of experience of the 5GMS. In response to the first access network device not performing step 104, but directly performs step 101 of sending the application layer measurement configuration to the terminal device, the application layer measurement configuration includes an indicator of quality of experience of the AR and the indicator of quality of experience of the 5GMS. The terminal device supports performing quality of experience measurement and collection only on the 5GMS, in other words, the indicator of quality of experience of the AR in the application layer measurement configuration is a redundant indicator of quality of experience. In this way, the terminal device further needs to perform quality of experience measurement and collection on the indicator of quality of experience of the AR carried in the application layer measurement configuration. However, because the terminal device does not support performing quality of experience measurement and collection on the AR, accuracy of performing quality of experience measurement and collection by the terminal device is reduced.

Figure 8:
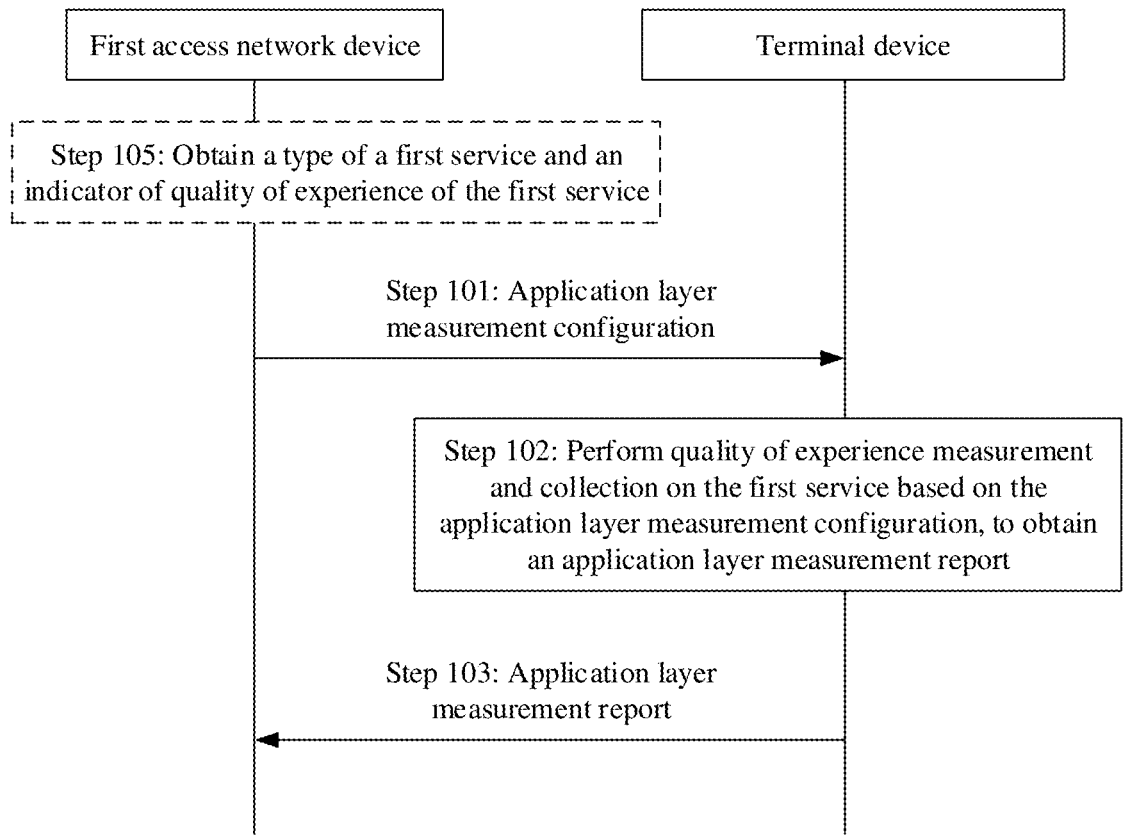
FIG. 8 is a flowchart of still another measurement method according to at least one embodiment.

In at least one embodiment, based on the technical solution in FIG. 4, as shown in FIG. 8, before step 101, the measurement method provided in at least one embodiment further includes the following step.

Step 105: The first access network device obtains the type of the first service and the indicator of quality of experience of the first service.

In at least one embodiment, the type of the first service and the indicator of quality of experience of the first service is sent by the second access network device or the core network device to the first access network device. Alternatively, in at least one embodiment, the type of the first service and the indicator of quality of experience of the first service is sent by a control device to the first access network device.

The control device is also referred to as a management system. The management system is an operation administration and maintenance (operation administration and maintenance, OAM) system or a network management system. The control device is configured to manage the first access network device. For example, an operator installs a program for the first access network device by using the control device, or configure a service type, an indicator of quality of experience, and the like for the first access network device by using the control device.

The following describes specific implementation processes of the foregoing embodiments of obtaining the type of the first service and the indicator of quality of experience of the first service by the first access network device.

1. The type of the first service and the indicator of quality of experience of the first service are sent by the second access network device or the core network device to the first access network device.

In an example, in response to an application layer measurement configuration being sent by the second access network device to the first access network device, the application layer measurement configuration is carried in any one of a retrieve terminal device context response (retrieve UE context response) message, a handover request (handover request) message, a trace start (trace start) message, or a secondary node addition request (s-node addition request or SGNB addition request) message.

The retrieve terminal device context response message is used to transmit a context of the terminal device to the first access network device. The retrieve terminal device context response message includes the application layer measurement configuration. The handover request message is used to request to resource that is prepared for handover. The handover request message includes the application layer measurement configuration. The trace start message is used to initiate a trace record on the terminal device. The trace start message includes the application layer measurement configuration. The secondary node addition request message is used to request a resource that is prepared for a dual-connectivity operation of the terminal device. The secondary node addition request message includes the application layer measurement configuration of the terminal device.

In another example, in response to the application layer measurement configuration being sent by the core network device to the first access network device, the application layer measurement configuration is carried in any one of an initial context setup request (initial context setup request) message, a handover request (handover request) message, or a trace start (trace start) message.

The initial context setup request message is used to request to set up the context of the terminal device. The initial context setup request message includes the application layer measurement configuration. For the handover request message and the trace start message, refer to the foregoing description. Details are not described herein again.

2. In response to the indicator of quality of experience of the first service being sent by the control device to the first access network device, the control device includes the memory shown in FIG. 3. The memory has a correspondence between the type of the first service and the indicator of quality of experience of the first service. For example, the correspondence is shown in Table 3. In this case, the control device sends the type of the first service and the indicator of quality of experience of the first service to the first access network device.

TABLE 3

| Type of the first service | Indicator of quality of experience |
|---|---|
| AR | For details, see Table 1 |
| VR | For details, see Table 1 |
| 5GMS | For details, see Table 2 |

For details about the indicator of quality of experience and the description of the indicator of quality of experience in Table 3, refer to Table 1 and Table 2. For example, in response to the type of the first service including the AR or the VR, the indicator of quality of experience of the first service is the indicator of quality of experience in Table 1. In response to the type of the first service including 5GMS, the indicator of quality of experience of the first service is the indicator of quality of experience in Table 2.

Before sending the type of the first service and the indicator of quality of experience of the first service to the first access network device, the second access network device or the core network device determines that the terminal device supports performing quality of experience measurement and collection on the first service.

In an example, the first access network device actively sends the capability information of the terminal device to the second access network device or the core network device. For example, the first access network device periodically sends the capability information of the terminal device to the second access network device or the core network device.

In another example, the first access network device alternatively sends the capability information of the terminal device to the second access network device or the core network device based on the second access network device or the core network device. For example, the second access network device or the core network device sends fourth query information to the first access network device. The fourth query information is used to obtain the capability information of the terminal device. After receiving the fourth query information from the second access network device or the core network device, the first access network device sends the capability information of the terminal device to the second access network device or the core network device.

In at least one embodiment, in response to the measurement method being applied to the 5G communication system shown in FIG. 2, the first access network device in step 101 and step 103 is replaced with a CU. In other words, step 101 is that the CU sends the application layer measurement configuration to the terminal device, and step 103 is that the CU receives the application layer measurement report from the terminal device. In this case, the measurement method further includes the CU sending the application layer measurement report to a DU.

Alternatively, the first access network device in step 101 and step 103 is replaced with a CU-CP. In other words, step 101 is that the CU-CP sends the application layer measurement configuration to the terminal device, and step 103 is that the CU-CP receives the application layer measurement report from the terminal device. In this case, the measurement method further includes the CU-CP sending the application layer measurement report to a DU; or the CU-CP sending the application layer measurement report to a CU-UP.

In at least one embodiment, after receiving the application layer measurement report from the terminal device, the first access network device (or the DU or the CU-UP of the first access network device) determines, based on the application layer measurement report, whether a wireless network used to transmit the service such as the AR, the VR, or the 5GMS needs to be optimized. For example, the first access network device determines, based on the value corresponding to the indicator of quality of experience in the application layer measurement report, whether to optimize the wireless network used to transmit the service such as the AR, the VR, or the 5GMS. In response to the value corresponding to the indicator of quality of experience being less than a threshold, the first access network device determines that the wireless network used to transmit the service such as the AR, the VR, or the 5GMS needs to be optimized. The threshold is preset. This is not limited.

In response to determining that the wireless network used to transmit the service such as the AR, the VR, or the 5GMS, needs to be optimized, the first access network device optimizes, in one or more of the following manners, the wireless network used to transmit the service such as the AR, the VR, or the 5GMS: (1) allocating cache resources; (2) selecting a radio bearer on which data packet scheduling needs to be performed; (3) managing a power level; and (4) managing a specific resource block that is used.

In at least one embodiment, after receiving the application layer measurement report from the terminal device, the first access network device further sends the application layer measurement report to the second access network device, so that the second access network device optimizes, based on the application layer measurement report, a wireless network used to transmit the first service.

The following describes the foregoing manners by using an example in which the first service is the VR, the indicator of quality of experience is a mean opinion score, and the first access network device optimizes a wireless network used to transmit the VR.

1. In response to a mean opinion score of the VR being less than a first threshold (for example, a highest value corresponding to the mean opinion score is 10, and the first threshold is 6), the first access network device allocates a first preset quantity of cache resources to the VR. The first preset quantity is greater than a quantity of cache resources preconfigured for the VR. The first threshold is preset. This is not limited. The cache resource preconfigured for the VR is a cache resource allocated by the first access network device to the VR in response to the mean opinion score being greater than or equal to the first threshold.

2. In response to the mean opinion score being less than the first threshold, the first access network device selects a radio bearer with a higher priority, to transmit data corresponding to the VR. Radio bearers have a plurality of levels, for example, a first level, a second level, and a third level. A priority of the first level is higher than a priority of the second level. A priority of the second level is higher than a priority of the third level. The first access network device transmits the data of the VR by using a radio bearer corresponding to the first level, and transmit data of another service by using a radio bearer corresponding to the second level or the third level.

3. In response to the mean opinion score being less than the first threshold, the first access network device increases a transmit power or a receive power used for the data corresponding to the VR. For example, the first access network device sends the data of the VR by using a first transmit power. The first transmit power is greater than a second transmit power. The second transmit power is a power used by the first access network device to send the data of the VR in response to the mean opinion score being greater than or equal to the first threshold.

4. In response to the mean opinion score being less than the first threshold, the first access network device allocates a specific resource block (where the resource block is used only to transmit the data of the VR) to the VR.

The solutions in the foregoing embodiments are combined on a premise that there is no contradiction.

In the foregoing embodiments, the method is described from perspectives of the access network device, the terminal device, and interaction between the access network device and the terminal device. To implement the functions in the method provided in the foregoing embodiments, each network element such as the access network device or the terminal device includes a corresponding hardware structure and/or software module for performing the functions. A person skilled in the art is aware that, in combination with algorithms and steps in the examples described herein, at least one embodiment is implemented by hardware or a combination of hardware and computer software. Whether a function is performed by hardware or hardware driven by computer software depends on particular implementations and design constraints of the technical solutions. A person skilled in the art is able to use different methods to implement the described functions for each particular embodiment. However, the implementation does not go beyond the scope of embodiments described herein.

In at least one embodiment, functional modules of the access network device and the terminal device is divided based on the foregoing method examples. For example, each functional module is obtained through division based on each corresponding function, or two or more functions is integrated into one processing module. The integrated module is implemented in a form of hardware, or is implemented in a form of a software functional module. In at least one embodiment, division into the modules is an example, and is merely logical function division. During actual implementation, another division manner is used.

Figure 9:
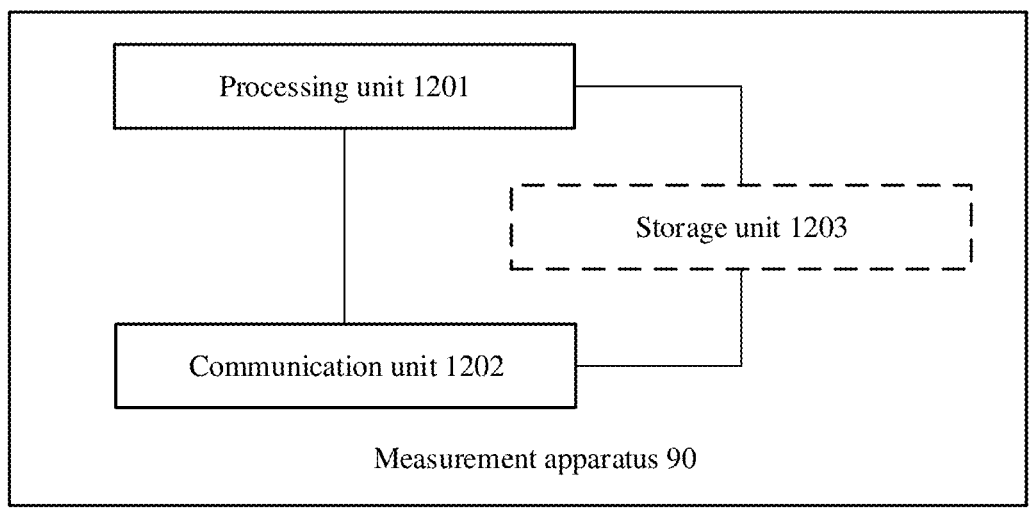
FIG. 9 is a schematic diagram of a structure of a measurement apparatus according to at least one embodiment.

In response to an integrated unit being used, FIG. 9 is a schematic diagram of a structure of a measurement apparatus (denoted as a measurement apparatus 90) in the foregoing embodiments. The measurement apparatus 90 includes a communication unit 1202 and a processing unit 1201, and further includes a storage unit 1203. The schematic diagram of the structure shown in FIG. 9 is used to show a structure of the terminal device in the foregoing embodiments.

In response to the schematic diagram of the structure shown in FIG. 9 being used to show the structure of the terminal device in the foregoing embodiments, the processing unit 1201 is configured to control and manage an action of the terminal device. For example, the processing unit 1201 is configured to: perform step 102 in FIG. 4 and step 1042 in FIG. 7A and FIG. 7B, and perform, by using the communication unit 1202, step 103 in FIG. 4, step 1043 in FIG. 7A and FIG. 7B, and/or an action performed by the terminal device in another process described in at least one embodiment. The processing unit 1201 communicates with another network entity by using the communication unit 1202, for example, communicate with the access network device 1 shown in FIG. 1. The storage unit 1203 is configured to store program code and data of the terminal device.

In response to the schematic diagram of the structure shown in FIG. 9 being used to show the structure of the terminal device in the foregoing embodiments, the measurement apparatus 90 is a terminal device, or is a chip in the terminal device.

In response to the measurement apparatus 90 being a terminal device, the processing unit 1201 is a processor or a controller. The communication unit 1202 is a communication interface, a transceiver, a transceiver machine, a transceiver circuit, a transceiver apparatus, or the like. The communication interface is a collective term, and includes one or more interfaces. The storage unit 1203 is a memory. In response to the measurement apparatus 90 being a chip in the terminal device, the processing unit 1201 is a processor or a controller. The communication unit 1202 is an input interface and/or an output interface, a pin, a circuit, or the like. The storage unit 1203 is a storage unit (for example, a register or a cache) in the chip, or is a storage unit (for example, a read-only memory (read-only memory, ROM for short) or a random access memory (random access memory, RAM for short)) outside the chip and in the terminal device or a first access network device.

Figure 10:
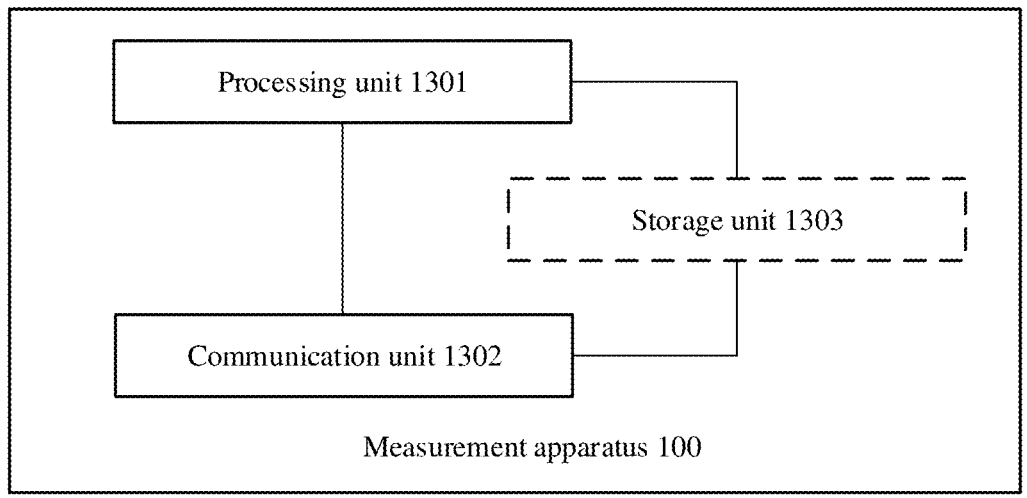
FIG. 10 is a schematic diagram of a structure of a measurement apparatus according to at least one embodiment.

In response to an integrated unit being used, FIG. 10 is a schematic diagram of a structure of a measurement apparatus (denoted as measurement apparatus 100) in the foregoing embodiments. The measurement apparatus 100 includes a communication unit 1302, and further includes a processing unit 1301 and a storage unit 1303. The schematic diagram of the structure shown in FIG. 10 is used to show a structure of the first access network device in the foregoing embodiments.

In response to the schematic diagram of the structure shown in FIG. 10 being used to show the structure of the first access network device in the foregoing embodiments, the processing unit 1301 is configured to control and manage an action of the first access network device. For example, the processing unit 1301 is configured to perform, by using the communication unit 1302, step 101 in FIG. 4, step 104 in FIG. 6, step 1041, step 1044, and step 1047 in FIG. 7A and FIG. 7B, step 105 in FIG. 8, and/or an action performed by the first access network device in another process described in at least one embodiment. The processing unit 1301 communicates with another network entity by using the communication unit 1302, for example, communicate with the terminal device shown in FIG. 1. The storage unit 1303 is configured to store program code and data of the first access network device.

In response to the schematic diagram of the structure shown in FIG. 10 being used to show the structure of the first access network device in the foregoing embodiments, the measurement apparatus 100 is a first access network device, or is a chip in the first access network device.

In response to the measurement apparatus 100 being a first access network device, the processing unit 1301 is a processor or a controller. The communication unit 1302 is a communication interface, a transceiver, a transceiver machine, a transceiver circuit, a transceiver apparatus, or the like. The communication interface is a collective term, and includes one or more interfaces. The storage unit 1303 is a memory. In response to the measurement apparatus 100 being a chip in the first access network device, the processing unit 1301 is a processor or a controller. The communication unit 1302 is an input interface and/or an output interface, a pin, a circuit, or the like. The storage unit 1303 is a storage unit (for example, a register or a cache) in the chip, or is a storage unit (for example, a read-only memory (read-only memory, ROM for short) or a random access memory (random access memory, RAM for short)) outside the chip and in the terminal device or the first access network device.

The communication unit is also referred to as a transceiver unit. Antennas and control circuits that are in the measurement apparatus 90 and the measurement apparatus 100 and that have a transceiver function is considered as a communication unit of the measurement apparatus. A processor that has a processing function is considered as a processing unit of the measurement apparatus. Optionally, a component that is in the communication unit and that is configured to implement a receiving function is considered as a receiving unit. The receiving unit is configured to perform a receiving step in at least one embodiment. The receiving unit is a receiver machine, a receiver, a receiver circuit, or the like. A component that is in the communication unit and that is configured to implement a sending function is considered as a sending unit. The sending unit is configured to perform a sending step in at least one embodiment. The sending unit is a transmitter machine, a transmitter, a transmitter circuit, or the like.

In response to integrated units in FIG. 9 and FIG. 10 each being implemented in a form of a software function module and sold or used as an independent product, the integrated unit is stored in a computer-readable storage medium. Based on such an understanding, the technical solutions of at least one embodiment, or the part contributing to the existing technology, or all or some of the technical solutions are implemented in the form of a software product. The computer software product is stored in a storage medium and includes several instructions to enable a computer device (which is a personal computer, a server, a first access network device, or the like) or a processor (processor) to perform all or some of the steps of the methods described in at least one embodiment. The storage medium storing the computer software product includes any medium that stores program code, such as a USB flash drive, a removable hard disk, a read-only memory, a random access memory, a magnetic disk, or an optical disc.

The units in FIG. 9 and FIG. 10 is alternatively referred to as modules. For example, the processing unit is referred to as a processing module.

Figure 11:
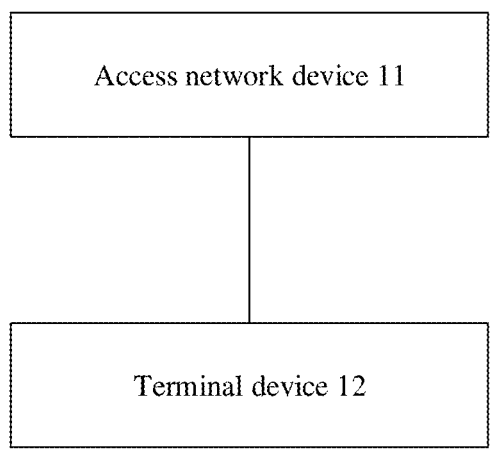
FIG. 11 is a schematic diagram of a structure of a communication system according to at least one embodiment.

FIG. 11 is an example diagram of a communication system according to at least one embodiment. The communication system includes an access network device 11 and a terminal device 12.

The access network device 11 is configured to perform the action performed by the access network device in the foregoing embodiments. For example, the access network device 11 is configured to perform step 101 in FIG. 4, step 104 in FIG. 6, step 1041, step 1044, and step 1047 in FIG. 7A and FIG. 7B, and step 105 in FIG. 8.

The terminal device 12 is configured to perform the action performed on the terminal device in the foregoing embodiments. For example, the terminal device 12 is configured to perform step 102 in FIG. 4, step 1042 in FIG. 7A and FIG. 7B, step 103 in FIG. 4, and step 1043 in FIG. 7A and FIG. 7B.

In an implementation process, steps of the methods in embodiments is completed by using a hardware integrated logical circuit in the processor, or by using instructions in a form of software. The steps of the methods disclosed with reference to at least one embodiment is directly performed by a hardware processor, or is performed by using a combination of hardware in the processor and a software module.

The processor in at least one embodiment includes but is not limited to at least one of the following computing devices that run software: a central processing unit (central processing unit, CPU), a microprocessor, a digital signal processor (DSP), a microcontroller unit (microcontroller unit, MCU), or an artificial intelligence processor. Each computing device includes one or more cores configured to perform an operation or processing by executing software instructions. The processor is an independent semiconductor chip, or is integrated with another circuit to form a semiconductor chip. For example, a SoC (system-on-a-chip) includes the processor and another circuit (for example, a codec circuit, a hardware acceleration circuit, or various buses and interface circuits). Alternatively, the processor is integrated into an ASIC as a built-in processor of the ASIC, and the ASIC integrated with the processor is independently packaged or is packaged with another circuit. In addition to the core configured to perform an operation or processing by executing software instructions, the processor further includes a hardware accelerator, for example, a field programmable gate array (field programmable gate array, FPGA), a PLD (programmable logic device), or a logic circuit that implements a dedicated logic operation.

The memory in at least one embodiment includes at least one of the following types: a read-only memory (read-only memory, ROM) or another type of static storage device that stores static information and instructions, or a random access memory (random access memory, RAM) or another type of dynamic storage device that stores information and instructions, or is an electrically erasable programmable read-only memory (Electrically erasable programmable-only memory, EEPROM). In some scenarios, the memory is alternatively a compact disc read-only memory (compact disc read-only memory, CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that is configured to carry or store expected program code in a form of instructions or a data structure and that is accessed by a computer. However, the memory is not limited thereto.

An least one embodiment provides a computer-readable storage medium, including instructions. In response to the instructions being run on a computer, the computer is enabled to perform any one of the foregoing methods.

At least one embodiment provides a computer program product including instructions. In response to the computer program product being run on a computer, the computer is enabled to perform any one of the foregoing methods.

At least one embodiment provides a communication system, including the foregoing first access network device and terminal device.

At least one embodiment provides a chip. The chip includes a processor and an interface circuit, where the interface circuit is coupled to the processor. The processor is configured to run a computer program or instructions, to implement the foregoing method. The interface circuit is configured to communicate with another module outside the chip.

All or some of the foregoing embodiments is implemented by using software, hardware, firmware, or any combination thereof. In response to a software program being used to implement embodiments, all or some of embodiments is implemented in a form of a computer program product. The computer program product includes one or more computer instructions. In response to the computer program instructions being loaded and executed on a computer, all or some of the procedures or functions according to at least one embodiment are generated. The computer is a general-purpose computer, a special-purpose computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium is any usable medium accessible by a computer, or a data storage device, for example, a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD for short)), or the like.

Although at least one embodiment is described, a person skilled in the art understands and implements another variation of the disclosed embodiments by viewing the accompanying drawings, disclosed content, and the appended claims. In the claims, "comprising" (comprising) does not exclude another component or another step, and "a" or "one" does not exclude a case of "a plurality of". A processor or another unit implements several functions enumerated in the claims. Some measures are recorded in dependent claims that are different from each other, but this does not mean that the measures cannot be combined to produce a good effect.

Although various modifications and combinations are able to be made to without departing from the spirit and scope of embodiments described herein. Correspondingly, the specification and accompanying drawings are merely example descriptions defined by the appended claims, and are considered as any of and all modifications, variations, combinations or equivalents that cover the scope of embodiments described herein. A person skilled in the art is able to make various modifications and variations without departing from the spirit and scope of embodiments described herein. Embodiments described herein are intended to cover the modifications and variations provided that they fall within the scope of the following claims and equivalent technologies described herein.

What is claimed is:

1. A measurement method, comprising:
sending, by a first access network device, an application layer measurement configuration to a terminal device, wherein the application layer measurement configuration indicates to the terminal device to perform quality of experience measurement and collection on a first service, the application layer measurement configuration includes a type of the first service and an indicator of quality of experience of the first service, and the type of the first service includes one or more of augmented reality (AR), virtual reality (VR), or 5th generation media streaming (5GMS); and
receiving, by the first access network device, an application layer measurement report from the terminal device, wherein the application layer measurement report includes quality of experience measurement and collection on the first service based on the application layer measurement configuration, and the application layer measurement report includes the type of the first service and a value corresponding to the indicator of quality of experience of the first service.

2. The measurement method according to claim 1, wherein the sending, by a first access network device, an application layer measurement configuration to a terminal device includes:
sending, by the first access network device, the application layer measurement configuration to the terminal device in response to the first access network device determining that the terminal device supports performing quality of experience measurement and collection on the first service.

3. The measurement method according to claim 1, wherein the method further comprises:
receiving, by the first access network device, capability information from the terminal device, wherein the capability information indicates that the terminal device supports performing quality of experience measurement and collection on the first service; and
determining, by the first access network device based on the capability information, that the terminal device supports performing quality of experience measurement and collection on the first service.

4. The measurement method according to claim 3, wherein before the receiving, by the first access network device, capability information from the terminal device, the method further comprises:
sending, by the first access network device, first query information to the terminal device, wherein the first query information indicates to the terminal device to obtain the capability information of the terminal device.

5. The measurement method according to claim 1, wherein
the type of the first service and the indicator of quality of experience of the first service are sent by a second access network device or a core network device to the first access network device; or
the type of the first service and the indicator of quality of experience of the first service are configured by a control device in the first access network device.

6. The measurement method according to claim 1, wherein the first access network device includes a centralized unit (CU) and a distributed unit (DU);

the sending, by a first access network device, an application layer measurement configuration to a terminal device includes:
sending, by the CU of the first access network device, the application layer measurement configuration to the terminal device;
the receiving, by the first access network device, an application layer measurement report from the terminal device includes:
receiving, by the CU of the first access network device, the application layer measurement report from the terminal device; and
the method further comprises: sending, by the CU of the first access network device, the application layer measurement report to the DU of the first access network device.

7. The measurement method according to claim 1, wherein the application layer measurement configuration is carried in a radio resource control (RRC) reconfiguration message or an RRC resume message.

8. The measurement method according to claim 1, wherein the application layer measurement report is carried in a measurement configuration application layer message, or an RRC reconfiguration message or an RRC resume message.

9. A measurement method, comprising:
receiving, by a terminal device, an application layer measurement configuration from a first access network device, wherein the application layer measurement configuration indicates to the terminal device to perform quality of experience measurement and collection on a first service, the application layer measurement configuration includes a type of the first service and an indicator of quality of experience of the first service, and the type of the first service includes one or more of augmented reality (AR), virtual reality (VR), or 5th generation media streaming (5GMS);
performing, by the terminal device, quality of experience measurement and collection on the first service based on the application layer measurement configuration, to obtain an application layer measurement report, wherein the application layer measurement report includes the type of the first service and a value corresponding to the indicator of quality of experience of the first service; and
sending, by the terminal device, the application layer measurement report to the first access network device.

10. The measurement method according to claim 9, wherein the method further comprises:
sending, by the terminal device, capability information to the first access network device, wherein the capability information indicates that the terminal device supports performing quality of experience measurement and collection on the first service.

11. The measurement method according to claim 10, wherein before the sending, by the terminal device, capability information to the first access network device, the method further comprises:
receiving, by the terminal device, first query information from the first access network device, wherein the first query information is used to obtain the capability information of the terminal device.

12. The measurement method according to claim 9, wherein the application layer measurement configuration is carried in a radio resource control (RRC) reconfiguration message or an RRC resume message; and wherein the application layer measurement report is carried in a measurement configuration application layer message, or an RRC reconfiguration message or an RRC resume message.

13. A communication apparatus, comprising:
at least one processor; and
a non-transitory computer-readable medium including computer-executable instructions that, in response to being executed by the processor, cause the processor to:
send an application layer measurement configuration to a terminal device, wherein the application layer measurement configuration indicates to the terminal device to perform quality of experience measurement and collection on a first service, the application layer measurement configuration includes a type of the first service and an indicator of quality of experience of the first service, and the type of the first service includes one or more of augmented reality (AR), virtual reality (VR), or 5th generation media streaming (5GMS); and
receive an application layer measurement report from the terminal device providing quality of experience measurement and collection on the first service based on receiving the application layer measurement configuration from the processor, and the application layer measurement report includes the type of the first service and a value corresponding to the indicator of quality of experience of the first service.

14. The apparatus according to claim 13, wherein the processor sends the application layer measurement configuration to a terminal device by:
sending the application layer measurement configuration to the terminal device in response to determining that the terminal device supports performing quality of experience measurement and collection on the first service.

15. The apparatus according to claim 13, wherein the processor is further configured to:
receive capability information from the terminal device, wherein the capability information indicates that the terminal device supports performing quality of experience measurement and collection on the first service; and
determine based on the capability information, that the terminal device supports performing quality of experience measurement and collection on the first service.

16. The apparatus according to claim 15, wherein the processor, before receiving the capability information from the terminal device:
sends first query information to the terminal device, wherein the first query information indicates to the terminal device to obtain the capability information.

17. The apparatus according to claim 13, wherein
the type of the first service and the indicator of quality of experience of the first service are received by the processor from a second access network device or a core network device; or
the processor is configured to implement a control device for configuring the type of the first service and the indicator of quality of experience of the first service.

18. The apparatus according to claim 13, wherein the processor is configured to provide a centralized unit (CU) and a distributed unit (DU);
the processor sending the application layer measurement configuration to the terminal device includes:
sending, by the CU provided by the processor, the application layer measurement configuration to the terminal device;
the processor receiving the application layer measurement report from the terminal device comprises includes:

receiving, by the CU provided by the processor, the application layer measurement report from the terminal device; and sending, by the CU provided by the processor, the application layer measurement report to the DU provided by the processor.

19. The apparatus according to claim 13, wherein the application layer measurement configuration is carried in a radio resource control (RRC) reconfiguration message or an RRC resume message.

20. The apparatus according to claim 13, wherein the application layer measurement report is carried in a measurement configuration application layer message, or an RRC reconfiguration message or an RRC resume message.

* * * * *